(12) United States Patent
Horita et al.

(10) Patent No.: US 11,794,728 B2
(45) Date of Patent: Oct. 24, 2023

(54) ELECTRONIC CONTROL DEVICE

(71) Applicant: Hitachi Astemo, Ltd., Hitachinaka (JP)

(72) Inventors: Yuki Horita, Tokyo (JP); Akira Kuriyama, Hitachinaka (JP); Tatsuhiko Monji, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 26 days.

(21) Appl. No.: 17/612,667

(22) PCT Filed: Apr. 27, 2020

(86) PCT No.: PCT/JP2020/018036
§ 371 (c)(1),
(2) Date: Nov. 19, 2021

(87) PCT Pub. No.: WO2020/241155
PCT Pub. Date: Dec. 3, 2020

(65) Prior Publication Data
US 2022/0242403 A1    Aug. 4, 2022

(30) Foreign Application Priority Data
May 27, 2019   (JP) .................................. 2019-098892

(51) Int. Cl.
*B60W 30/08*  (2012.01)
*B60W 40/02*  (2006.01)
*G08G 1/16*   (2006.01)

(52) U.S. Cl.
CPC ............ *B60W 30/08* (2013.01); *B60W 40/02* (2013.01); *G08G 1/167* (2013.01)

(58) Field of Classification Search
None
See application file for complete search history.

(56) References Cited

U.S. PATENT DOCUMENTS 11,027,653 B2 *  6/2021  Kim ...................... B60W 10/18
11,479,269 B2 * 10/2022  Cheon .................. G01S 13/931
(Continued)

FOREIGN PATENT DOCUMENTS

CA    2923924 A1 *  4/2011  ............ B60W 30/08
JP    2009-301400 A    12/2009
(Continued)

OTHER PUBLICATIONS

International Search Report, PCT/JP2020/018036, dated Aug. 4, 2020, 2 pgs.
(Continued)

*Primary Examiner* — Muhammad Adnan
(74) *Attorney, Agent, or Firm* — Volpe Koenig

(57) ABSTRACT

A vehicle electronic controller includes a peripheral obstacle identification section identifying obstacles near the vehicle, a blind spot region identification section identifying a blind spot region which is not in a detection range of the obstacle identification section, a region determination section which classifies the blind spot region into either a dangerous blind or a safe blind spot region and an obstacle region presumption section which presumes an obstacle presence region which is a region that a latent obstacle which is the latent obstacle which could be present at a previous time in the dangerous blind spot region which was classified at the previous time can be present at a present time, in which the region determination section determines that a region which overlaps with at least the obstacle presence region in the blind spot region that the blind spot region identification section identified is the dangerous blind spot region.

15 Claims, 13 Drawing Sheets

(56) References Cited

U.S. PATENT DOCUMENTS

| | | | | |
|---|---|---|---|---|
| 2008/0189040 | A1* | 8/2008 | Nasu | G08G 1/163 701/301 |
| 2009/0096634 | A1* | 4/2009 | Emam | G08G 1/167 340/901 |
| 2013/0169425 | A1* | 7/2013 | Victor | B60Q 5/006 340/435 |
| 2013/0311075 | A1* | 11/2013 | Tran | B60W 50/14 701/117 |
| 2015/0232028 | A1* | 8/2015 | Reardon | B60R 1/00 348/148 |
| 2016/0355178 | A1* | 12/2016 | Shiraishi | B60W 30/14 |
| 2017/0309181 | A1* | 10/2017 | Lee | B60Q 5/006 |
| 2018/0268701 | A1* | 9/2018 | Sato | B60Q 1/503 |
| 2019/0291646 | A1* | 9/2019 | DuBridge | B60Q 9/008 |
| 2020/0128372 | A1* | 4/2020 | Zhang | H04W 4/44 |
| 2020/0406747 | A1* | 12/2020 | Sakai | G08G 1/167 |
| 2021/0394750 | A1* | 12/2021 | Oh | B60W 40/02 |
| 2022/0055619 | A1* | 2/2022 | Yang | B60W 50/14 |
| 2022/0314968 | A1* | 10/2022 | Horita | G01S 13/931 |
| 2022/0319185 | A1* | 10/2022 | Zhao | G08G 1/167 |
| 2022/0319318 | A1* | 10/2022 | Takehara | G08G 1/096844 |
| 2022/0410939 | A1* | 12/2022 | Zhang | B60W 30/0953 |

FOREIGN PATENT DOCUMENTS

| | | |
|---|---|---|
| JP | 2016-122308 A | 7/2016 |
| JP | 2016-224785 A | 12/2016 |
| JP | 2018-101295 A | 6/2018 |
| JP | 2018-101434 A | 6/2018 |
| JP | 2018101295 A * | 6/2018 |

OTHER PUBLICATIONS

Chinese Office Action dated Feb. 16, 2023 for Chinese Patent Application No. 202080037663.4.

* cited by examiner

FIG. 2A
FIG. 2B
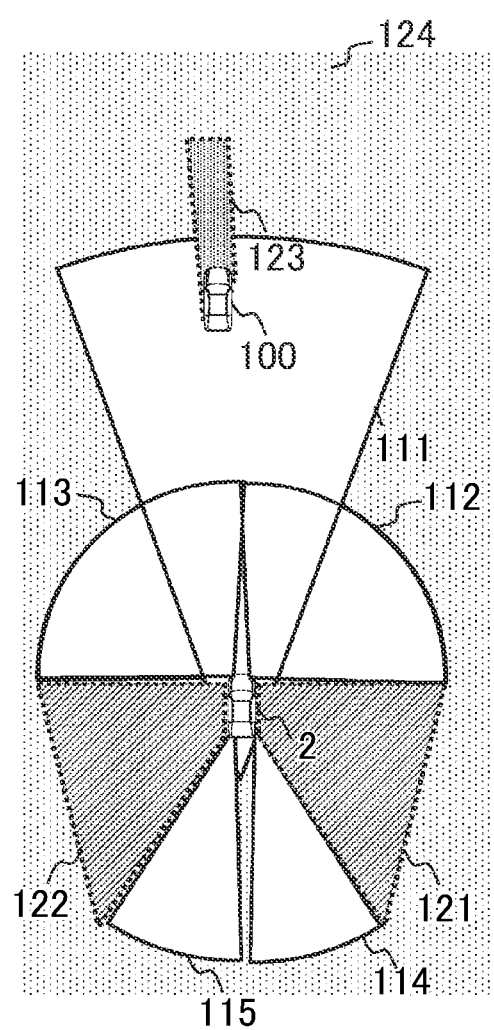
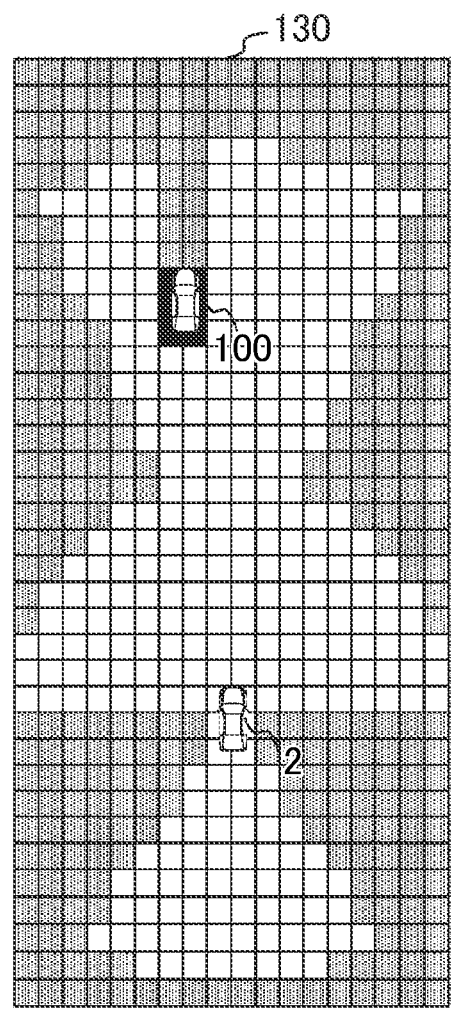

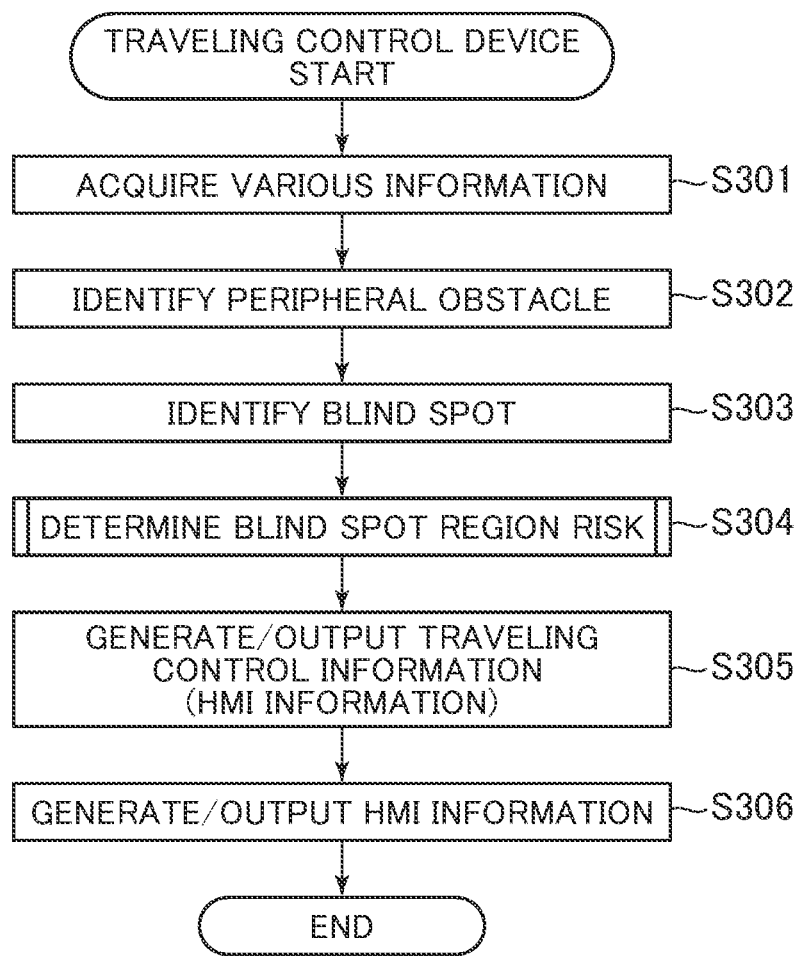

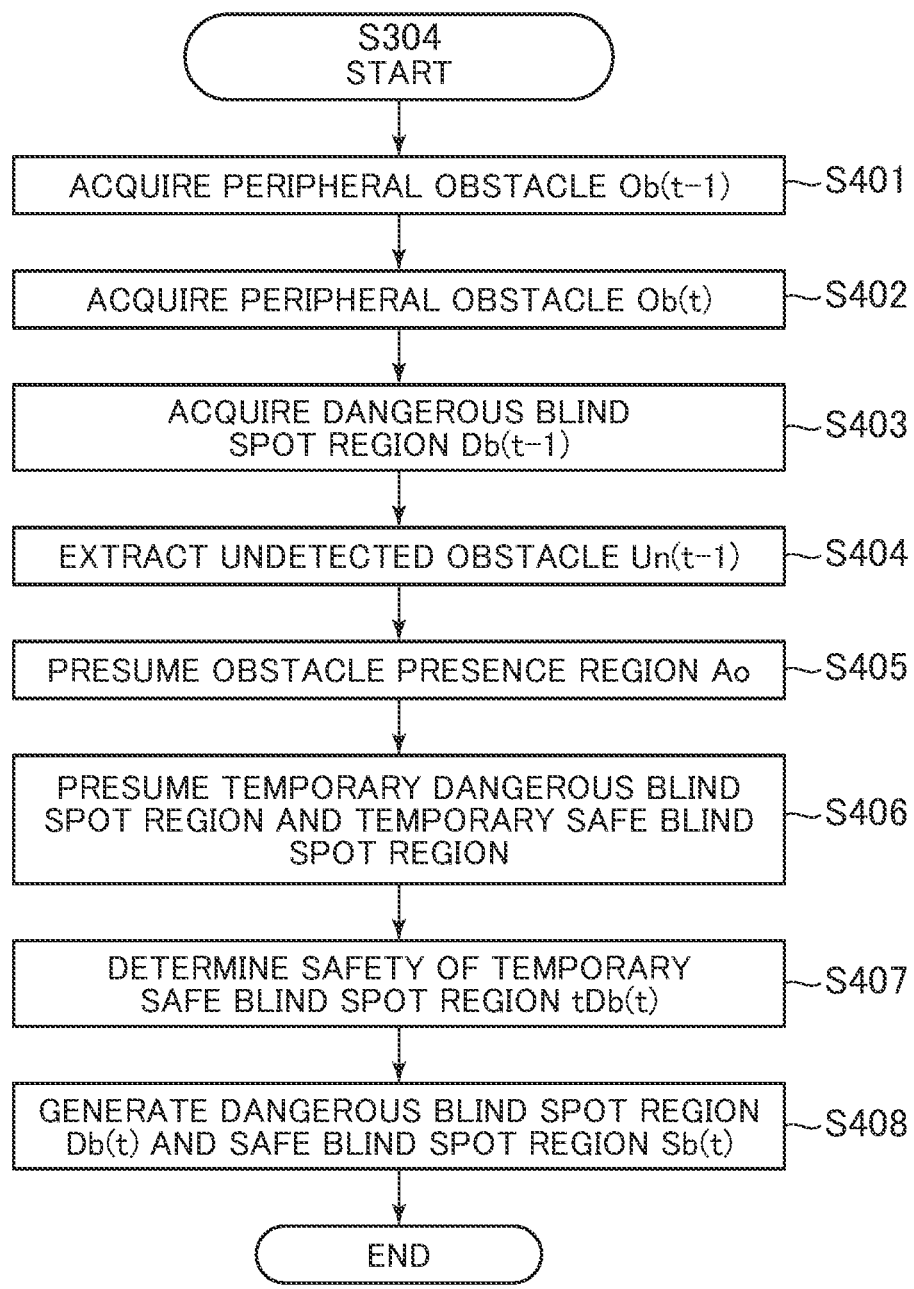

FIG. 7A
FIG. 7B
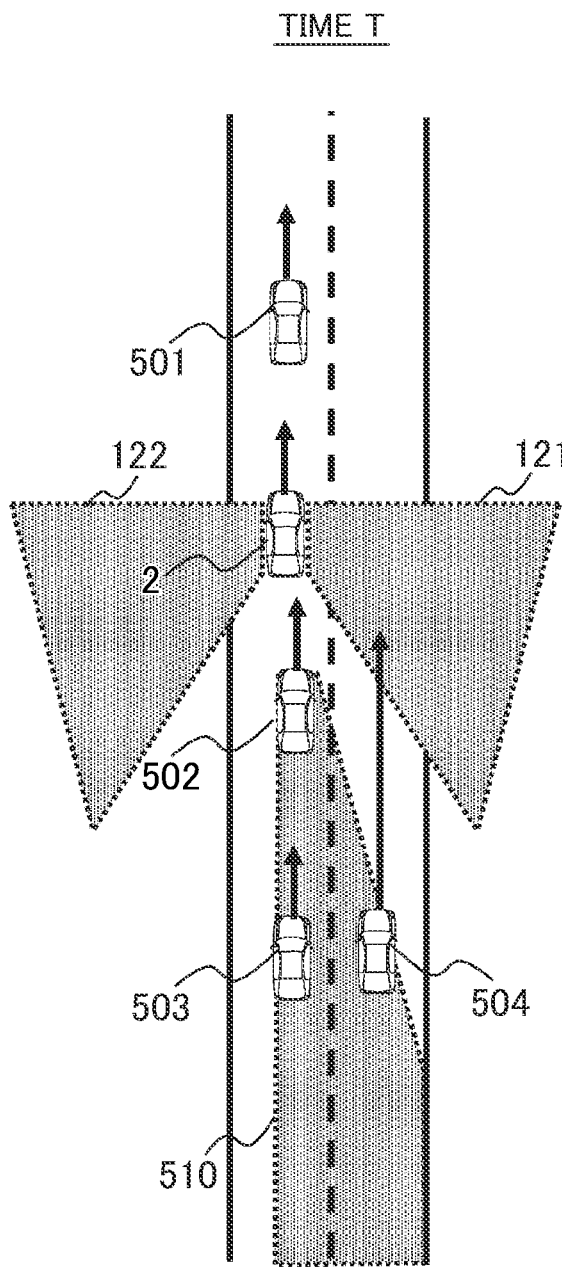
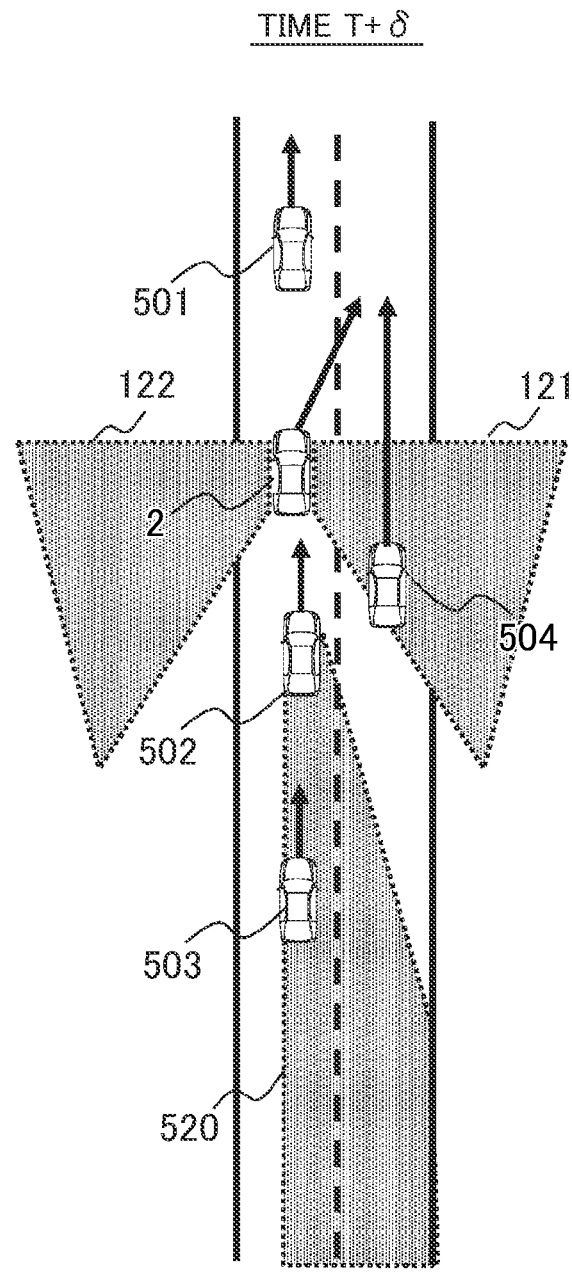

FIG. 8A
FIG. 8B
TIME T−α
TIME T TO T+δ
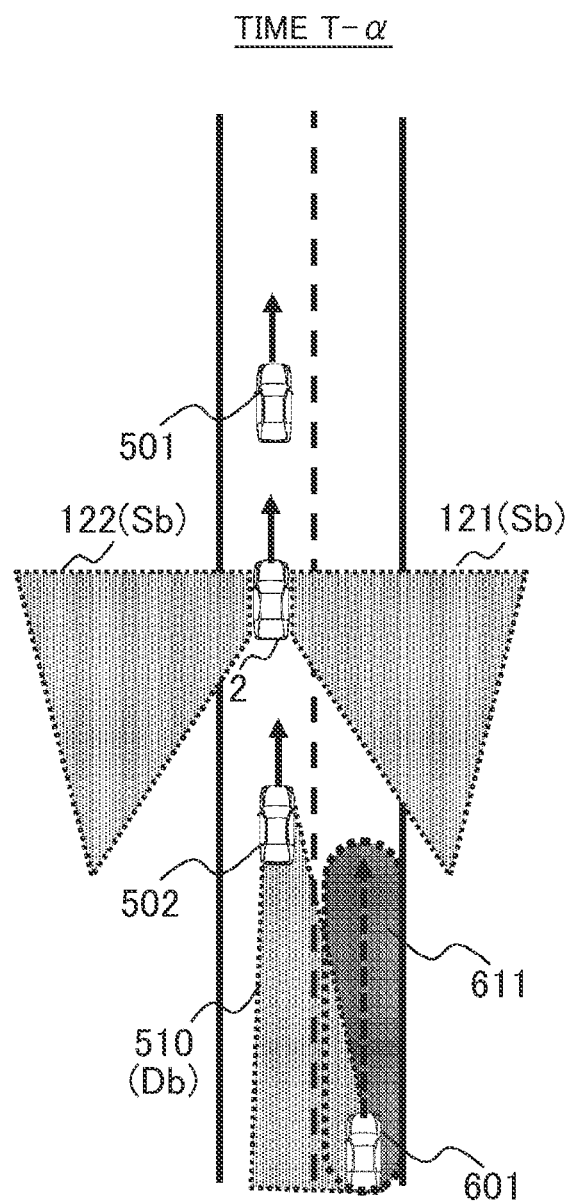
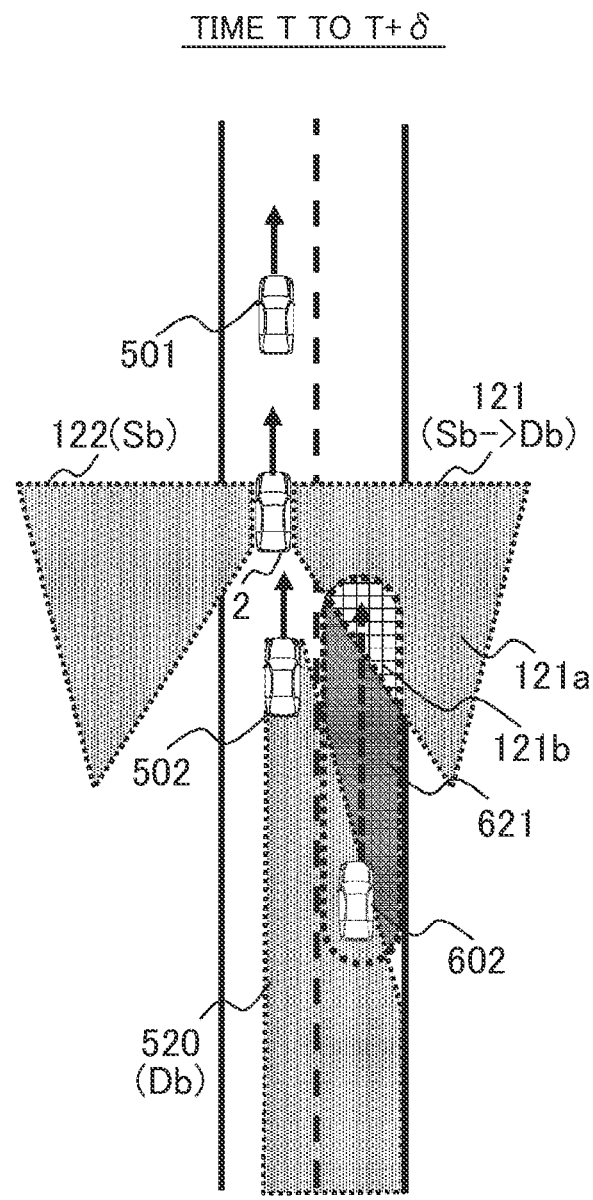

ELECTRONIC CONTROL DEVICE

TECHNICAL FIELD

The present invention relates to an electronic control device.

BACKGROUND ART

Recently, a technology for deciding a risk which lurks in a region which becomes a blind spot for a sensor which recognizes a peripheral environment of a vehicle is proposed in order to realize comfortable and safe driving support and automatic driving of the vehicle. In Patent Literature 1, there is disclosed an object detection device which is characterized by being equipped with an object detection means which detects an object which is present around an own vehicle by a plurality of sensors, a present-time object information acquisition means which acquires present-time relative position and relative speed of the object which was detected by the aforementioned object detection means, a previous-time object information acquisition means which acquires previous-time relative position and relative speed of the object which was detected by the aforementioned object detection means, an intrusion candidate blind spot region decision means which outputs the one that the object is located in a blind spot peripheral region which surrounds the blind spot region concerned at the previous time in a blind spot region which is out of a detection range of the aforementioned object detection means and an orientation of a previous-time relative speed of the object concerned is a direction of the blind spot region concerned as a candidate for the blind spot region that the object concerned intrudes at the present time, a blind spot intrusion decision which, in a case where the object is not present at the present time in a blind spot peripheral region which surrounds the blind spot region which was decided as the candidate by the aforementioned intrusion candidate blind spot region decision means, decides that the object concerned has intruded into the blind spot region concerned, a blind spot region exit decision means which, in a case where the object is present at the present time in the blind spot peripheral region which surrounds the blind spot region which was decided that the object is present at the previous time, decides that the object concerned has exited from the blind spot region concerned, and a decision integration means which integrates the blind spot region that the object is present at the previous time, the blind spot region into which the object intruded at the present time and the blind spot region from which the object exited at the present time together and decides the blind spot region that the object is present at the present time.

CITATION LIST

Patent Literature

Patent Literature 1: Japanese Patent Application Laid-Open No. 2018-101295

SUMMARY OF INVENTION

Technical Problem

In the invention which is described in the Patent Literature 1, it cannot deal with the obstacle that the sensor cannot detect and there is room for improvement in safety.

Solution to Problem

An electronic control device according to a first aspect of the present invention is the electronic control device which is loaded on a vehicle and is equipped with a peripheral obstacle identification section which identifies an obstacle which is present around the aforementioned vehicle on the basis of an output from a sensor which is loaded on the aforementioned vehicle, a blind spot region identification section which identifies a blind spot region which is not contained in a detection range of the aforementioned peripheral obstacle identification section, a region determination section which classifies the aforementioned blind spot region into a dangerous blind spot region that the obstacle can be present and a safe blind spot region that the obstacle is not present, and an obstacle region presumption section which presumes an obstacle presence region which is a region that a latent obstacle which is the latent obstacle which could be present at a previous time in the aforementioned dangerous blind spot region which was classified at the previous time can be present at a present time, in which the aforementioned region determination section determines that a region which overlaps with at least the aforementioned obstacle presence region in the blind spot region that the aforementioned blind spot region identification section identified is the aforementioned dangerous blind spot region.

Advantageous Effects of Invention

According to the present invention, the dangerous blind spot region can be calculated by taking also the latent obstacle that the sensor cannot detect into consideration.

BRIEF DESCRIPTION OF DRAWINGS

FIG. 2A is a diagram explaining a situation which becomes a premise of explanation of a blind spot region and FIG. 2B is a diagram which corresponds to FIG. 2A and illustrates the blind spot region.

FIG. 5 is a flowchart illustrating processing of the traveling control device 3.

FIG. 6 is a flowchart explaining a blind spot region risk determination process which is executed in S304 in FIG. 5.

FIGS. 7A and 7B are a first operation example, in which FIG. 7A is a diagram illustrating a state at a time T and FIG. 7B is a diagram illustrating a state at a time T+δ.

FIG. 8A is a diagram illustrating a processing result at a time T−α and FIG. 8B is a diagram illustrating a processing result a time T to at the time T+δ.

DESCRIPTION OF EMBODIMENTS

Embodiment

In the following, an embodiment of a traveling control device will be described with reference to FIG. 1 to FIG. 11.

(System Configuration)

Figure 1:
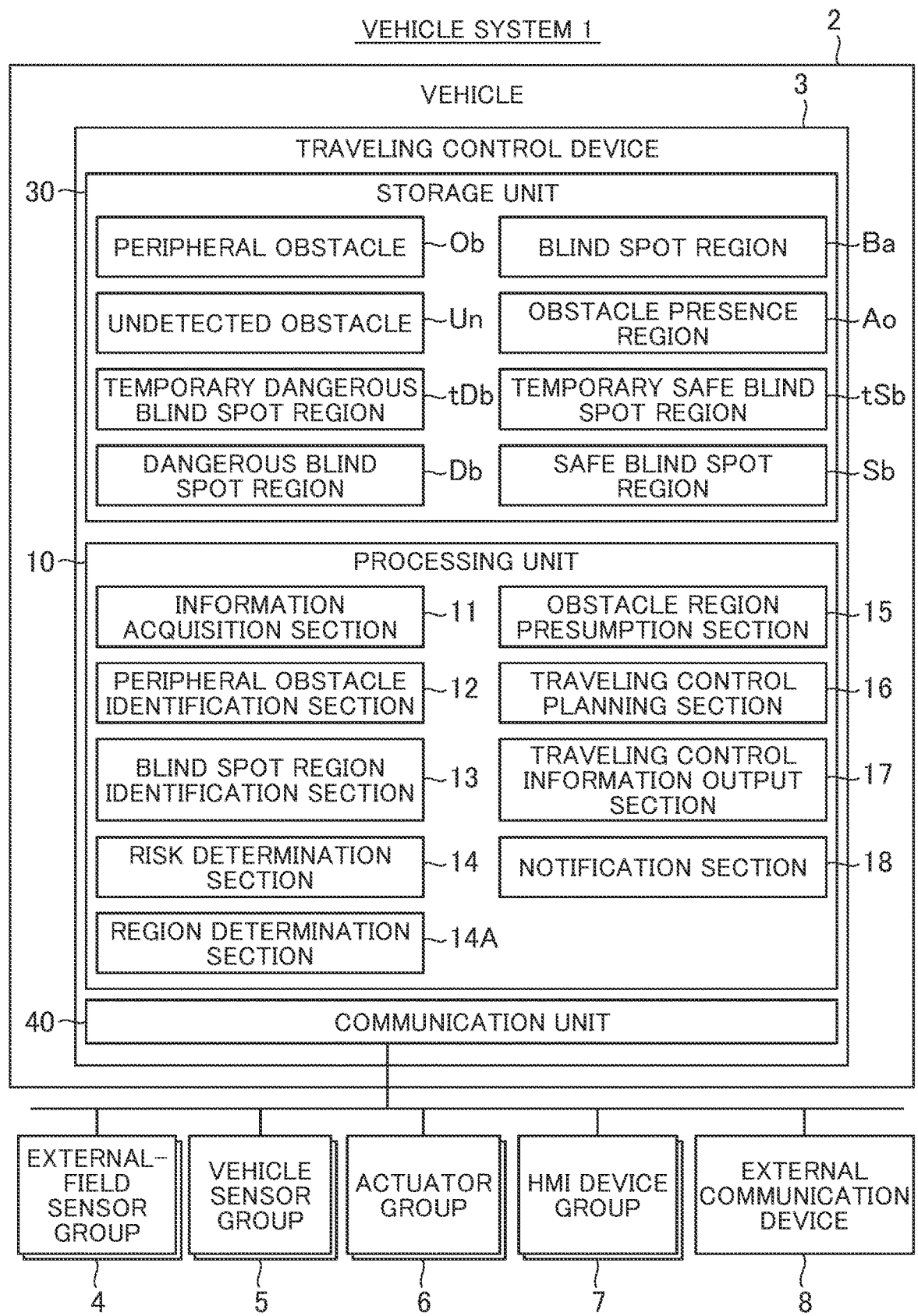
FIG. 1 is a functional block diagram of a traveling control device in an embodiment.

FIG. 1 is a functional block diagram illustrating a configuration of a vehicle system 1 which includes the travelling control device 3 pertaining to the embodiment of the present invention. The vehicle system 1 is loaded on a vehicle 2. The vehicle system 1 recognizes situations of a traveling road and obstacles such as peripheral vehicles and so forth around the vehicle 2 and then performs appropriate driving support and traveling control. As illustrated in FIG. 1, the vehicle system 1 is configured by including the traveling control device 3, an external-field sensor group 4, a vehicle sensor group 55, an actuator group 6, an HMI device group 7, and an external communication device 8. The traveling control device 3, the external-field sensor group 4, the vehicle sensor group 5, the actuator group 6, the HMI device group 7, and the external communication device 8 are connected together over an in-vehicle network N. Incidentally, in the following, for discrimination of the vehicle 2 from other vehicles, the vehicle 2 will be also called the "own vehicle" 2.

The traveling control device 3 is an ECU (Electronic Control Unit). The traveling control device 3 generates traveling control information for driving support or automatic driving of the vehicle 2 on the basis of various kinds of sensor information and so forth which are provided from the external-field sensor group 4 and the vehicle sensor group 5 and outputs them to the actuator group 6 and the HMI device group 7. The traveling control device 3 has a processing unit 10, a storage unit 30, and a communication unit 40. The traveling control device 3 cyclically executes processing which will be described later, for example, every 100 ms. In the following, this cycle will be called a "processing cycle".

The processing unit 10 is configured by including, for example, a CPU (Central Processing Unit) which is a central arithmetic processing device. However, it may be configured by including a GPU (Graphic Processing Unit), an FPGA (Field-Programmable Gate Array), an ASIC (application specific integrated circuit) and so forth in addition to the CPU and may be configured by any one of them.

The processing unit 10 has an information acquisition section 11, a peripheral obstacle identification section 12, a blind spot region identification section 13, a risk determination section 14, an obstacle region presumption section 15, a traveling control planning section 16, a traveling control information output section 17, and a notification section 18 as functions thereof. The processing unit 10 realizes them by executing a predetermined operation program which is stored in the storage unit 30. Incidentally, processes of the risk determination section 14 and the obstacle region presumption section 15 will be described later in detail with reference to FIG. 3 and so forth.

The information acquisition section 11 acquires various kinds of information from other devices which are connected to the traveling control device 3 over the in-vehicle network N and stores them into the storage unit 30. For example, it acquires a peripheral obstacle Ob which is information on an obstacle around the vehicle 2 that the external-field sensor group 4 detected, a blind spot region Ba which is information on the blind spot region of the external-field sensor group 4, vehicle information which relates to a motion, a state and so forth of the vehicle 2 that the vehicle sensor group 5 and so forth detected, statistical information which is acquired from the outside of the vehicle via the external communication device 8 and so forth and others.

The peripheral obstacle identification section 12 complements the peripheral obstacle Ob that the information acquisition section 11 acquired as necessary. There are cases where overlapping and missing are contained in the peripheral obstacle Ob which is acquired from the external-field sensor group 4. In such a case, the peripheral obstacle identification section 2 presumes a state of the peripheral obstacle which is the highest in possibility, while performing integration and interpolation of the information, in light of a result of arithmetic operations by the risk determination section 14 and so forth in a past, for example, in an immediately previous processing cycle, in addition to, for example, acquired obstacle information, and then identifies it as peripheral obstacle information. Processing of the peripheral obstacle identification section 12 is called, in general, fusion Processing. However, the peripheral obstacle identification section 12 may output the peripheral obstacle Ob which was acquired from the external-field sensor group 4 as it is. In addition, the peripheral obstacle identification section 12 may perform coordinate transformation on the peripheral obstacle Ob which was acquired from the external-field sensor group 4 as necessary. For simplicity of explanation, in the present embodiment, it is supposed that the peripheral obstacle identification section 12 outputs the peripheral object Ob that the external-field sensor group 4 outputs as it is.

The blind spot region identification section 13 identifies the blind spot region around the vehicle 2 on the basis of the blind spot region Ba which was acquired by the information acquisition section 11. The blind spot region Ba which is acquired from the external-field sensor group 4 is, the blind spot region itself may be expressed by grid-like mapping expression and so forth such as, for example, OGM (Occupancy Grid Map) and information which is necessary for identification of the blind spot region such as a set of a detection range (an angle, a distance and so forth) and detection information of the external-field sensor group 4 may be expressed. The detection information of the external-field sensor group 4 is point cloud data that, for example, a LiDAR (Light Detection And Ranging) acquires.

The blind spot region identification section 13 may output the blind spot region Ba which was acquired from the external-field sensor group 4 as it is. In addition, the blind spot region identification section 13 may perform coordinate transformation on the blind spot region Ba which was acquired from the external-field sensor group 4 as necessary. In the present embodiment, for simplicity of explanation, it is supposed that the blind spot region identification section 13 outputs the blind spot region Ba that the external sensor group 4 outputs as it is.

A region determination section 14A determines whether the blind spot region Ba that the blind spot region identification section 13 identified is safe or not, that is, whether it is a temporary dangerous blind spot region tDb or a temporary safe blind spot region tSb. Incidentally, the blind spot region Ba, the temporary dangerous blind spot region tDb, and the temporary safe blind spot region tSb which are called here are conceptual ones and any of them is a set of regions. Although also a case where the entire of the blind spot region Ba is the temporary dangerous blind spot region tDb or the temporary safe blind spot region tSb is supposed, in the scope of the present embodiment, it is determined that part of the blind spot region Ba is the temporary dangerous blind spot region tDb and it is determined that a remaining region of the blind spot region Ba is the temporary safe blind spot region tSb.

The risk determination section 14 determines the risk of the temporary dangerous blind spot region tDb that the region determination section 14A determined. In a case where the risk determination section 14 determines that the risk of the temporary dangerous blind spot region tDb is small, that is, it is safe, it defines that region as a safe blind spot region Sb. In a case where the risk determination section 14 determines that the risk of the temporary dangerous blind spot region tDb is not small, that is, it is dangerous, it defines that region as a dangerous blind spot region Db. The risk determination section 14 defines that the temporary safe blind spot region tSb is wholly the safe blind spot region Sb. When saying the operation of the risk determination section 14 in other words, the risk determination section 14 determines whether the temporary dangerous blind spot region tDb is safe or not and changes a region that it determined to be safe from the dangerous blind spot region Db to the safe blind spot region Sb.

The obstacle region presumption section 15 presumes a region which is not identified by the peripheral obstacle identification section but has a possibility that the obstacle is latently present. This region is a sum of sets of a region that the risk determination section determined as the dangerous blind spot region Db previously and a range that a latent obstacle which will be described later moved.

The traveling control planning section 16 generates traveling control information which is planning information which relates to traveling control of the vehicle 2 on the basis of, mainly, the dangerous blind spot region Db and the safe blind spot region Sb that the risk determination section 14 outputs. The traveling control information may be information which becomes a standard for controlling the actuator group 6 such as information on a railroad track that the vehicle 2 is to be traveled and may be information which becomes a control command value for controlling each actuator, for example, a target yaw rate and so forth in a case of steering.

The traveling control information output section 17 outputs the traveling control information that the traveling control planning section 16 generated to the outside of the traveling control device 3 in accordance with a predetermined communication specification. The notification section 18 generates/outputs information which is to be notified to a driver and an occupant in a case where the traveling control device 3 executes traveling control of the vehicle 2.

The storage unit 30 is configured by including, for example, storage devices such as an HDD (Hard Disk Drive), a flash memory, a ROM (Read Only Memory) and so forth and memories such as a RAM and so forth. A program that the processing unit 10 processes, data group and so forth which are necessary for processing it are stored in the storage unit 30. In addition, the processing unit 10 is utilized also for the purpose of temporarily storing data which is necessary for arithmetic operations of the program as a main storage when the processing unit 10 executes the program. In the present embodiment, as information for realizing the functions of the traveling control device 3, the peripheral obstacle Ob, the blind spot region Ba, an undetected obstacle Un, an obstacle presence region Ao, the temporary dangerous blind spot region tDb, the temporary safe blind spot region tSb, the dangerous blind spot region Db, and the safe blind spot region Sb are stored.

The peripheral obstacle Ob is information which relates to the obstacle which is present around the vehicle 2. The blind spot region Ba is information which indicates a region which becomes a blind spot of the external-field sensor group 4 which is loaded on the vehicle 2. The undetected obstacle Un is information which indicates an obstacle which had been detected by the external-field sensor group 4 previously but then was no longer detected. The obstacle presence region Ao is information which indicates a region that presence of the obstacle is presumed.

The temporary dangerous blind spot region tDb is information which indicates a temporary region which is the blind spot of the external-field sensor group 4 and is presumed to be dangerous. However, "temporary" means that no final decision is made and a region which was finally decided and has the same meaning is the dangerous blind spot region Db. The temporary safe blind spot region tSb is information which indicates a temporary region which is the blind spot of the external-field sensor group 4 and is presumed to be safe. However, "temporary" means that no final decision is made and a region which was finally decided and has the same meaning is the safe blind spot region Sb. Incidentally, there is a possibility that the obstacle is present in the dangerous blind spot region Db and an obstacle whose presence was assumed is called a "latent obstacle".

It is sufficient for the peripheral obstacle Ob and the undetected obstacle Un to be able to identify the obstacle and various expression forms can be used. It is sufficient for the blind spot region Ba, the obstacle presence region Ao, the temporary dangerous blind spot region tDb, the temporary safe blind spot region tSb, the dangerous blind spot region Db, and the safe blind spot region Sb to be able to identify the region and various expression forms can be used.

As described above, although each of the peripheral obstacle Ob, the blind spot region Ba, the undetected obstacle Un, the obstacle presence region Ao, the temporary dangerous blind spot region tDb, the temporary safe blind spot region tSb, the dangerous blind spot region Db, and the safe blind spot region Sb is information, in the following description, also the contents thereof will be described with the same names for convenience. For example, although the blind spot region Ba is information which indicates the region which becomes the blind spot of the external-field sensor group 4 which is loaded on the vehicle 2, there are also cases where the region itself which becomes the blind spot of the external-field sensor group 4 which is loaded on the vehicle 2 is called the blind spot region Ba.

In addition, although not illustrated in the drawings, a vehicle information data group is, also a vehicle information data group which is a set of data on the motion, the state, plans and so forth of the vehicle 2 is stored in the storage unit 30. Vehicle information which was acquired by the information acquisition section 11 and that the vehicle sensor group 5 and so forth detected, traveling control information that the traveling control planning section 16 generated and so forth are contained in the vehicle information data group. Information on, for example, a position, a traveling speed, a steering angle, an accelerator operation amount, a brake operation amount, a traveling route and so forth of the vehicle 2 is contained in the vehicle information.

The communication unit 40 is configured by including a network card and so forth which conform to communication standards such as, for example, IEEE802.3 or CAN (Controller Area Network) and so forth. The communication unit 40 performs data transmission and reception together with other devices in the vehicle system 1 on the basis of various protocols.

Incidentally, although in the present embodiment, the communication unit 40 and the processing unit 10 are described separately, part of processing of the communication unit 40 may be executed in the processing unit 10. For example, it may be also configured such that hardware device equivalent in communication processing is located on the communication unit 40 and a device driver group and communication protocol processing and so forth other than that are located in the processing unit 10.

The external-field sensor group 4 is an aggregate of devices which detect a peripheral state of the vehicle 2. For example, a camera device, a millimeter-wave radar, a LiDAR, a sonar and so forth correspond to the external-field sensor group 4. The external-field sensor group 4 detects environmental factors such as the obstacles, a road environment, traffic rules and so forth in a predetermined range from the vehicle 2 and outputs them to the in-vehicle network N. The "obstacles" are, for example, other vehicles which are vehicles other than the vehicle 2, pedestrians, road falling objects and so forth. The "road environment" is, for example, positions of white lines and ends of road, a road surface condition and so forth. The "traffic rules" are, for example, road signs, signals and so forth.

The vehicle sensor group 5 is an aggregate of devices which detect various states of the vehicle 2. Each vehicle sensor detects, for example, position information, the traveling speed, the steering angle, the accelerator operation amount, the brake operation amount and so forth of the vehicle 2 and outputs them to the in-vehicle network N.

The actuator group 6 is a device group which controls controlling elements such as a steerage, a brake, an accelerator and so forth which decides the motion of the vehicle. The actuator group 6 controls the motion of the vehicle on the basis of information on operations of a handle, a brake pedal, an accelerator pedal and so forth by the driver and control information which is output from the traveling control device 3.

The HMI device group 7 is a device group for performing inputting of information from the driver and the occupant into the vehicle system 1 and notification of information from the vehicle system 1 to the driver and the occupant. A display, a loudspeaker, a vibrator, a switch and so forth are included in the HMI device group 7.

The external communication device 8 is a communication module which performs wireless communication with the outside of the vehicle system 1. The external communication device 8 is communicable with, for example, a center system (not described) and the Internet for providing/distributing services to the vehicle system 1.

FIG. 2 is explanatory diagrams of the blind spot region Ba. FIG. 2A is a diagram explaining a situation and FIG. 2B corresponds to FIG. 2A and is a diagram illustrating the blind spot region Ba.

In an example which is illustrated in FIG. 2A, the external-field sensor group 4 of the vehicle 2 is configured by five sensors and respective sensors can detect obstacles in ranges of signs 111 to 115 in maximum. However, in a case where the obstacle is present, whether another obstacle is present far away from that obstacle cannot be detected. In FIG. 2A, a white region indicates a range that the external-field sensor group 4 is detecting that the obstacle is not present, and a hatched region indicates a range that the external-field sensor group 4 cannot detect the obstacle, that is, the blind spot of the external-field sensor group 4.

As illustrated in FIG. 2A, the blind spot of the external-field sensor group 4 is a region that regions which are out-of-detection range of the external-field sensor group 4 and denoted by signs 121, 122, and 124 and a region 123 which is shielded with another vehicle 100 which is an obstacle are added together. Incidentally, the blind spot which is out-of-detection range of the external-field sensor group 4 is broadly classified into two of a blind spot which generates because, although it is oriented in a direction that the external-field sensor group 4 can detect, it is far away therefrom in distance such as the region 124 and a blind spot which generates because it is oriented in a direction that the external-field sensor group 4 cannot detect in the first place such as the region 121 and the region 122. The blind spot which generates caused by the distance is, since a range that the external-field sensor group 4 is able to ensure detection of the obstacle frequently changes depending on the traveling environment such as weather conditions and so forth, it is desirable for the external-field sensor group 4 to dynamically calculate the detection range in accordance with the traveling environment.

FIG. 2B is a grid map which corresponds to FIG. 2A and illustrates one example of the blind spot region Ba that the external-field sensor group 4 outputs in a situation which is illustrated in FIG. 2A. FIG. 2B is a diagram which is defined by an x-y coordinate system that the present position of the vehicle 2 is set at the center and a state of detection by the external-field sensor group 4 at each position of coordinate values (x, y) that x and y are expressed with variables respectively is expressed as a grid-like map in a predetermined region. The state of detection is expressed with, for example, three values of "obstacle is present (already detected)", "obstacle is not present (already detected)" and "not clear (not-yet detected)". In the example which is illustrated in FIG. 2B, the blind spot region corresponds to the "not clear (not-yet detected)".

In FIG. 2B, the periphery of the vehicle 100 indicates the "obstacle is present (already detected)", a region which is hatched in some way in FIG. 2A indicates the "not clear (not-yet-detected)", and a white region indicates the "obstacle is not present (already detected)". Although, here, the example of the three values is illustrated, a probability that the obstacle is present may be expressed as continuous values (decimals of 0 to 1) in place of discrete values which are called the detection states. The blind spot region Ba may be expressed in units of grids of the grip-like map which is illustrated in FIG. 2B and may be expressed with an aggregate of a plurality of cells. In addition, the blind spot region Ba may be expressed with the one other than the grid-like map and may be expressed with forms such as, for example, the region 122 and the region 123 in FIG. 2A. In the following description of the present embodiment, for simplicity of explanation, the blind spot region Ba is expressed not with the grip-like map but with the form.

(Outline of Functions)

Figure 3:
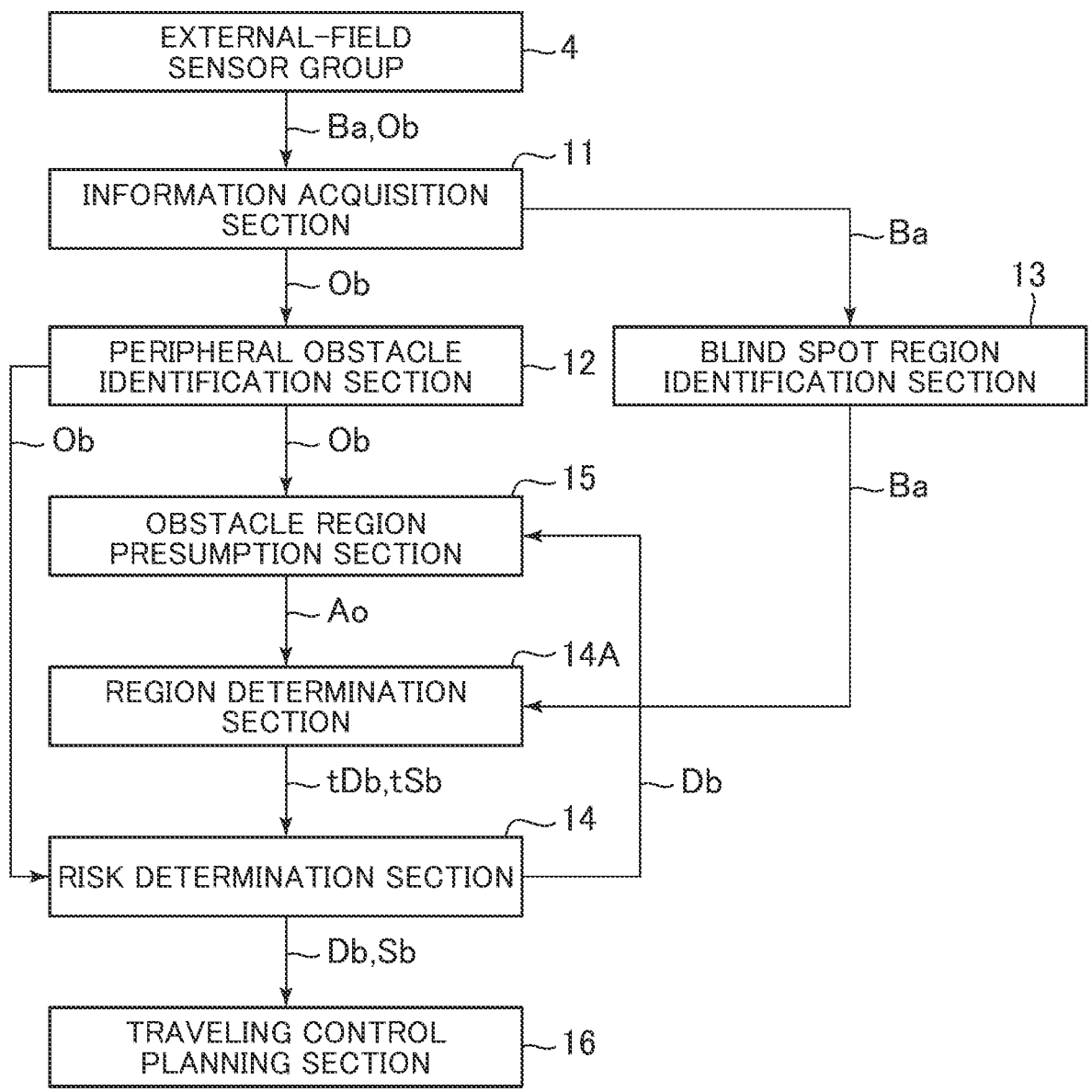
FIG. 3 is a diagram illustrating a correlation among functions that the traveling control device in the embodiment realizes.

FIG. 3 is a diagram illustrating a correlation among functions that the traveling control device 3 realizes. Incidentally, although the external-field sensor group 4 is not the function that the traveling control device 3 realizes, it is described in FIG. 3 for clarifying the correlation. The information acquisition section 11 acquires the peripheral obstacle Ob and the blind spot region Ba from the external-field sensor group 4 and outputs them to the peripheral obstacle identification section 12 and the blind spot region identification section 13. The peripheral obstacle identification section 12 performs complement processing on the acquired peripheral obstacle Ob as necessary and outputs the peripheral obstacle Ob to the risk determination section 14 and the obstacle region presumption section 15. The blind spot region identification section 13 performs the complement processing on the acquired blind spot region Ba as necessary and outputs the blind spot region Ba to the region determination section 14A.

The peripheral obstacle Ob is input into the obstacle region presumption section 15 from the peripheral obstacle identification section 12 and the dangerous blind spot region Db is input into it from the risk determination section 14. The obstacle region presumption section 15 outputs a region that a region that the latent obstacle moves and the dangerous blind spot region Db are added together to the region determination section 14A as the obstacle presence region Ao. The latent obstacle is extracted from each of a time-series difference of the peripheral obstacle Ob and the dangerous blind spot region Db. If the dangerous blind spot region Db is not present and then in a case where also the peripheral obstacle Ob is not utterly detected over a plurality of processing cycles, the obstacle presence region Ao is not present, that is, it becomes an empty set. However, in a case where either one of the dangerous blind spot region Db and the peripheral obstacle Ob is present, the obstacle presence region Ao does not become the empty set.

Extraction of the latent obstacle using the time-series difference of the peripheral obstacle Ob can be realized by verifying a corresponding relation between, for example, the peripheral obstacle Ob in the immediately previous processing cycle and the peripheral obstacle Ob in the latest processing cycle. That is, it can be determined that the obstacle which is present in the immediately previous processing cycle but disappeared in the latest processing cycle hid behind another obstacle, that is, became the latent obstacle. Extraction of the latent obstacle using the dangerous blind spot region Db is calculated in the dangerous blind spot region Db such that the risk to the own vehicle 22 becomes the highest. For example, it is calculated in the dangerous blind spot region Db and at a position that a distance between it and the own vehicle 2 is the closest.

The blind spot region Ba is input into the region determination section 14A from the blind spot region identification section 13 and the obstacle presence region Ao is input into it from the obstacle region presumption section 15. The region determination section 14A defines a region that the obstacle presence region Ao overlaps with the blind spot region Ba, that is, a product set as the temporary dangerous blind spot region tDb and defines a region which does not overlap with the obstacle presence region Ao in the blind spot region Ba as the temporary safe blind spot region tSb. The region determination section 14A outputs the temporary dangerous blind spot region tDb and the temporary safe blind spot region tSb to the risk determination section 14.

Figure 4:
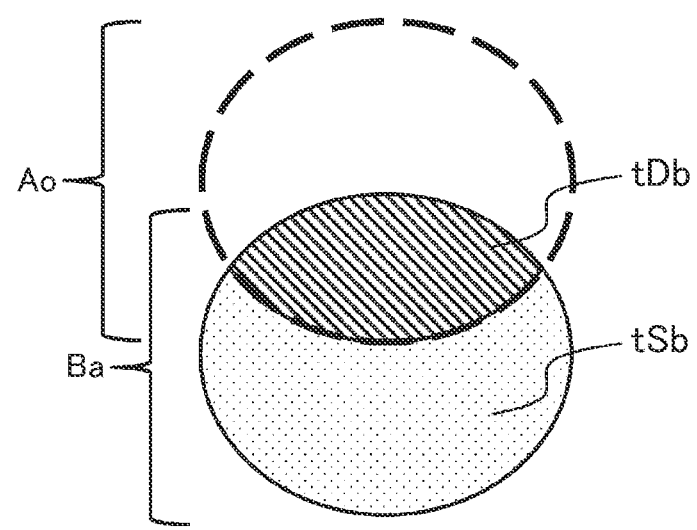
FIG. 4 is a diagram illustrating contents that a region determination section determines.

FIG. 4 is a diagram illustrating contents of determination of the region determination section 14A. In FIG. 4, a thick broken-line circle which is illustrated on an upper part indicates the obstacle presence region Ao, and a thin solid-line circle which is illustrated on a lower part indicates the blind spot region Ba. A diagonally hatched region which is the product set of the both and is indicated at the center which is illustrated in the drawing is the temporary dangerous blind spot region tDb. It is the region which does not overlap with the obstacle presence region Ao in the blind spot region Ba. A dotted and hatched region on a lower part which is illustrated in the drawing is the temporary safe blind spot region tSb.

The temporary dangerous blind spot region tDb and the temporary safe blind spot region tSb are input into the risk determination section 14 from the region determination section 14A and the peripheral obstacle Ob is input into it from the information acquisition section 11. The risk determination section 14 determines the risk of the temporary dangerous blind spot region tDb by using the peripheral obstacle Ob and generates the dangerous blind spot region Db and the safe blind spot region Sb. The risk determination section 14 removes a region that it determined to be safe from the temporary dangerous blind spot region tDb and thereby generates the dangerous blind spot region Db. The risk determination section 14 adds the temporary dangerous blind spot region tDb that it determined to be safe to the temporary safe blind spot region tSb and thereby generates the safe blind spot region Sb. The risk determination section 14 outputs each of the dangerous blind spot region Db and the safe blind spot region Sb to the traveling control planning section 16 and outputs the dangerous blind spot region Db to the obstacle region presumption section 15. Incidentally, the obstacle region presumption section 15 utilizes the received dangerous blind spot region Db in the next processing cycle.

The operation of the vehicle system 1 will be described by using FIG. 5 to FIG. 11. The traveling control device 3 determines the risk of the blind spot region which is present around the vehicle 2 on the basis of the information which is acquired from the external-field sensor group 4 and so forth, generates traveling control information on the vehicle 2 and outputs it. The actuator group 6 controls each actuator of the vehicle 2 in accordance with the traveling control information that the traveling control device 3 outputs and thereby traveling control of the vehicle 2 is realized. In addition, the traveling control device 3 generates HMI information as the information to be notified to the driver and the occupant upon controlling traveling of the vehicle 2 and outputs it to the HMI device group 7. Thereby, it becomes possible to make the driver recognize the risk on travelling so as to encourage safe driving and to present a state of the vehicle system 1 during automatic travelling to the driver and the occupant.

FIG. 5 is a flowchart illustrating processes of the traveling control device 3. The traveling control device 3 cyclically executes the processes in S301 to S306 which will be described in the following, for example, every 100 ms. In addition, for clarification of an anteroposterior relation between/among the processing cycles, which is a conceptual time is used. For example, in a case where an output from the external-field sensor group 4 in a certain processing cycle is expressed as a blind spot region Ba(t), an output from the external-field sensor group 4 in an immediately previous processing cycle thereof is expressed as a blind spot region Ba(t−1).

First, in S301, the information acquisition section 11 acquires necessary information from other devices over the in-vehicle network N and stores it into the storage unit 30. Various kinds of information are the peripheral obstacle Ob which is the information on the obstacle around the vehicle that the external-field sensor group 4 detected, the blind spot region Ba which is information on the blind spot region of the external-field sensor group 4, vehicle information which relates to the motion, the state and so forth of the vehicle 2 that the vehicle sensor group 5 and so forth detected, and statistical information and others which are acquired from the outside of the vehicle via the external communication device 8 and so forth.

Then, in S302, the peripheral obstacle identification section 12 performs fusion processing which is based on the peripheral obstacle Ob that it acquired in S301, the peripheral obstacle Ob that the peripheral obstacle identification section 12 identified in the previous processing cycle and so forth and identifies the peripheral obstacle Ob in a this-time processing cycle. Incidentally, the peripheral obstacle Ob that the peripheral obstacle identification section 12 identified in the previous processing cycle is stored in the storage unit 30.

In S303, the blind spot region identification section 13 identifies the blind spot region Ba in the this-time processing cycle on the basis of the blind spot region Ba that it acquired in step S301 and stores it into the storage unit 30. In a case where only the states in that processing cycle such as the detection range (the angle, the distance and so forth) and the detection information and so forth are output from the external-field sensor group 4, it is desirable to presume a detection state which is the highest in possibility probabilistically by combining it with the blind spot region Ba that it identified in the previous processing cycle and then to determine the blind spot region Ba.

In S304, the traveling control device 3 executes a blind spot region risk determination process of performing risk determination of the blind spot region Ba on the basis of the peripheral obstacle Ob and the blind spot region Ba that they identified in S302 and S303. Although details of S304 will be described later by using FIG. 4, the dangerous blind spot region Db and the safe blind spot region Sb are calculated by a process in S304. In S305, the traveling control planning section 16 generates the traveling control information on the basis of the peripheral obstacle Ob, the blind spot region Ba, the dangerous blind spot region Db, and the safe blind spot region Sb that they identified in S302 to S304 and the traveling control information output section 17 outputs the traveling control information to the actuator group 6 over the network. Then, finally, in S306, the notification section 18 generates the HMI information as the information which is to be notified to the driver/the occupant and outputs that information to the HMI device group 7 over the network.

(Blind Spot Region Risk Determination Process)

FIG. 6 is a flowchart explaining a blind spot region risk determination process which is executed in S304 in FIG. 5. First, in S401, the obstacle region presumption section 15 acquires a peripheral obstacle (t−1) that the peripheral obstacle identification section 12 identified in the previous processing cycle from the storage unit 30. Then, in S402, the obstacle region presumption section 15 acquires a peripheral obstacle (t) that the peripheral obstacle identification section 12 identified in the this-time processing cycle from the storage unit 30. Then, in S403, the obstacle region presumption section 15 acquires a dangerous blind spot region Db (t−1) that the risk determination section 14 identified in the previous processing cycle from the storage unit 30.

Then, in S404, the obstacle region presumption section 15 extracts an undetected obstacle Un(t−1) on the basis of the peripheral obstacle (t−1) that it acquired in S401 and the peripheral obstacle (t) that it identified in S402. The undetected obstacle Un(t−1) is an obstacle which is not contained in the peripheral obstacle (t) that it identified in the this-time processing cycle in the peripheral obstacle (t−1). It guesses that the obstacle which has been detected as the obstacle up to the previous processing cycle but was not detected any more in the this-time processing cycle has entered the blind spot region and extracts it as the undetected obstacle Un(t−1) in order to utilize it in a later process.

Then, in S405, the obstacle region presumption section 15 presumes the obstacle presence region Ao on the basis of the dangerous blind spot region Db(t−1) and the undetected obstacle Un(t−1) that it identified respectively in S402, S403, and S404. When taking the possibility of presence of a stationary obstacle in the dangerous blind spot region Db(t−1) which has been determined that the obstacle can be present therein in the previous processing cycle into consideration, there is the possibility that the obstacle is present therein also in the this-time processing cycle. Accordingly, the dangerous blind spot region Db(t−1) is contained at least in the obstacle presence region Ao.

On the other hand, since a predetermined time elapses while shifting from the previous processing cycle to the this-time processing cycle, in a case where the obstacle moves, the latent obstacle can be present also in its moving range. Accordingly, it calculates a region that the latent obstacle can move until reaching the this-time processing cycle on the basis of state values of the undetected obstacle Un in the previous processing cycle such as, for example, a relative position, a speed, and an acceleration and so forth. Then, it presumes a region that the dangerous blind spot region Db(t−1) and the region that the latent obstacle can move are added together as the obstacle presence region Ao.

In S406, the region determination section 14A presumes a temporary dangerous blind spot region tDb(t) and a temporary safe blind spot region tSb(t) on the basis of the blind spot region Ba(t) that it identified in S303 and the obstacle presence region Ao that it obtained in S405. As described with reference to FIG. 4, this process is calculated as a set product and a set difference.

Since the safety is taken on the highest priority in traveling control, in determination of whether the obstacle can be present in the blind spot region, a policy to determine that the obstacle can be present is desirable as long as there is even a slight possibility. Therefore, the obstacle presence region Ao calculates such that all regions to which the latent obstacle can reach up to the this-time processing cycle are contained in addition to the dangerous blind spot region Db(t−1) which is the blind spot region that it determined that the obstacle can be present in the previous processing cycle. Accordingly, it can be safely determined that there is no possibility of intrusion of also the latent obstacle into a blind spot region (t) which does not overlap with an obstacle presence region Ao(t) and the obstacle is not present therein.

However, when determining to the safety side, there is a tendency to always determine that the obstacle can be present. Accordingly, in S407, the risk determination section 14 performs safety determination on the temporary dangerous blind spot region tDb(t) which was determined in S406 by another means. Specifically, in a case where it was assumed that the obstacle is present in the temporary dangerous blind spot region tDb(t), in a case where the behavior of another obstacle which was detected by the external-field sensor group 4 and so forth is in contradiction with that assumption, it determines that the obstacle is not present in that temporary dangerous blind spot region tDb(t). In this case, that temporary dangerous blind spot region tDb(t) is determined as the safe blind spot region Sb(t).

For example, in a case where a certain peripheral obstacle was going toward the temporary dangerous blind spot region tDb(t) at an unstoppable speed, when assuming that the obstacle is present in that temporary dangerous blind spot region tDb(t), that peripheral obstacle will collide with the assumed obstacle. Since also the peripheral obstacle should move so as not to collide with another obstacle, it follows that this assumption is in contradiction with it. Accordingly, it can be decided that the obstacle is not present in this temporary dangerous blind spot region tDb(t). Details will be described later.

Finally, in S408, the risk determination section 14 generates the dangerous blind spot region Db(t) and the safe blind spot region Sb(t). Specifically, the risk determination section 14 defines the one as the dangerous blind spot region Db(t) except a region which was determined to be safe in S407 in the temporary dangerous blind spot region tDb(t) which was presumed in S406. In addition, the risk determination section 14 adds the temporary dangerous blind spot region tDb(t) which was determined to be safe in S407 to the temporary safe blind spot region tSb(t) which was presumed in step S406 and thereby defines it as the safe blind spot region Sb(t).

Incidentally, in S405, although a plurality of latent obstacles may be generated so as to cover all the possibilities of the latent obstacles, in many cases, it is possible to deal with it by generating a latent obstacle which is the greatest in risk to the vehicle 2 practically. For example, when it is a blind spot region which is present on the rear of a lane change destination at the time of lane change to a passing lane, a passing vehicle which runs out from a boundary of the blind spot region concerned at an expectable maximum speed is supposed. In addition, for example, when it is a blind spot region which is present in front of an opposite lane, an opposite vehicle which comes down the road toward it from the boundary of the blind spot region concerned at the expectable maximum speed is supposed. These are, it is possible to deal with a case which is lower in risk than the assumption concerned, for example, also a latent obstacle which is lower than an upper-limit speed by determining the risk on the basis of the assumption concerned.

As described above, the blind spot region risk determination process which is indicated in S304 is constructed to determine presence/absence of the obstacle in the blind spot region on the basis of information which was determined in a previous process, the peripheral obstacle information which was identified in S302 and the blind spot region information which was identified in S303.

First Operation Example

Three operation examples will be described with reference to FIG. 7 to FIG. 11. First, in the first operation example which refers to FIG. 7 to FIG. 8, specific operations in S405 to S407 in the blind spot risk determination process S304 will be described.

FIG. 7 is a diagram illustrating a situation of the operation example and illustrates a scene that the own vehicle 2 which is traveling along a general lane on a two-lane road tries to change the lane to the right-side passing lane which is illustrated in the drawing. FIG. 7A illustrates a state at a time T and FIG. 7B illustrates a state at a time T+δ which is the time which comes after the time T.

At the time T which is indicated in FIG. 7A, the vehicle 2 is traveling along the congested general lane. Specifically, another vehicle 501 is traveling at the front of the vehicle 2 and other vehicles 502, 503 are traveling at the back thereof along the same lane at speeds which are equivalent to that of the vehicle 2. In addition, another vehicle 504 is traveling at the back thereof along an adjacent passing lane at a speed which is faster than that of the vehicle 2. The configuration of the external-field sensor group 4 of the vehicle is the same as that in FIG. 2A and the blind spot regions such as the regions 121, 122 are formed. In addition, on the rear of the vehicle 2, a blind spot region which is indicated by a region 510 is formed with another vehicle 502 serving as a shield. Accordingly, it is in a state where another vehicle 503, another vehicle 504 cannot be detected from the vehicle 2 at the time T. Incidentally, since another vehicle 502 is traveling along a traveling lane, slightly deviating to the right, the region 510 largely bulges to the right side which is illustrated in the drawing.

At the time T+δ which is indicated in FIG. 7A, there is no particular change on the general lane and the vehicle 2 and other vehicles 501 to 503 are traveling at the equivalent speeds. On the other hand, on the passing lane, another vehicle 504 which is faster than the vehicle 2 in speed gets closer just behind the vehicle 2 and enters the blind spot region 121. In a case where the external-field sensor group 4 of the vehicle 2 could not detect another vehicle 504 in a transition process from a situation which is illustrated in FIG. 7A to a situation which is illustrated in FIG. 7B, it is feared that the traveling control device 3 cannot correctly evaluate the risk of the blind spot region 121. Specifically, it is feared that the traveling control device 3 would determine that any vehicle is not present in the blind spot region 121 in the situation which is illustrated in FIG. 7B. If it determines in this way, there is a risk that the vehicle 2 would try to change the lane and would collide with another vehicle 504. This problem is solved, for example, as follows.

FIG. 8A is a diagram illustrating a result of the blind spot region risk determination process at a time T−α which is the time which comes before that in FIG. 7A. FIG. 8B is a diagram illustrating a result of the blind spot region risk determination process at a time between those in FIG. 7A and FIG. 7B. Incidentally, in FIG. 8, another vehicle 503 and another vehicle 504 which are obstacles that the external-field sensor group 4 of the vehicle 2 does not detect are not described. In addition, a vehicle which is denoted by a sign 601 is a virtual vehicle and does not indicate another vehicle 504 itself in FIG. 7. In FIG. 8B, there are also cases where a description is made by dividing the region 121 into a region 121a and a region 121b. The region 121a is a region which is shown by hatching which is the same as the region 122 and the region 121b is a region which is shown by grip-like hatching.

FIG. 8A illustrates a state of the blind spot region risk determination process at a time T−α which is the time which comes before that in FIG. 7A. Since the vehicle 502 is located at a position which is slightly apart from the vehicle 2 in comparison with the scene at the time T which is illustrated in FIG. 5, a space between the blind spot region 121 and the blind spot region 510 is wide.

A flow of determination of the traveling control device 3 in the situation which is illustrated in FIG. 8A will be described following the flowchart in FIG. 6. In S401 to S403, the traveling control device 3 acquires information. Incidentally, there is no increase/decrease of obstacles between the peripheral obstacle Ob(t−1) which is acquired in S401 and the peripheral obstacle Ob(t) which is acquired in S402. In addition, the dangerous blind spot region Db(t−1) which is acquired in S403 is only the region 510, and the region 121 and the region 122 were determined as the safe blind spot region Sb(t−1). Although, in S404, the traveling control device 3 performs extraction of the undetected obstacle Un(t−1), since there is no increase/decrease of the obstacles between the peripheral obstacle Ob(t−1) and the peripheral obstacle Ob(t), the undetected obstacle Un(t−1) is not extracted.

Accordingly, the obstacle present region Ao that it presumed in S405 becomes a region that the blind spot region 510 in the previous processing cycle and a region 611 that the latent obstacle 601 can move from the previous processing cycle to the this-time processing cycle are added together. The region 611 that the latent obstacle 601 can move from the previous processing cycle to the this-time processing cycle can be calculated by a product of an assumable maximum speed and a processing cycle, for example a product of twice the legally permitted speed and 100 ms. Incidentally, the latent obstacle 601 is not limited to one and also the latent obstacle 601 which moves right forward from directly behind another vehicle 502 may be presumed as well, in addition to the position which is illustrated in, for example, FIG. 6. In an example which is illustrated in FIG. 8A, the region 611 that the latent obstacle 601 can move from the previous processing cycle to the this-time processing cycle did not reach the blind spot region 121.

In S406, the region determination section 14A collates the obstacle presence region Ao which was calculated in S405 with the blind spot regions 121, 122, 510 which are the blind spot region Ba(t) and presumes the temporary dangerous blind spot region tDb and the temporary safe blind spot region tSb. Since, in this example, the blind spot region which overlaps with the obstacle presence region Ao is only the blind spot region 510, the temporary dangerous blind spot region tDb(t) becomes the blind spot region 510.

In S407, the risk determination section 14 cannot detect a vehicle which approaches the temporary dangerous blind spot region tDb(t) and therefore does not perform any special process. In the following S408, the risk determination section 14 outputs the temporary dangerous blind spot region tDb(t) as the dangerous blind spot region Db(t), and the temporary safe blind spot region tSb as the safe blind spot region Sb and terminates the blind spot risk determination process.

A flow of determination of the traveling control device 3 in a situation which is illustrated in FIG. 8B will be described. In FIG. 8B, in comparison with the situation which is illustrated in FIG. 8A, the vehicle 502 approaches the vehicle 2 and a space between the blind spot region 121 and the blind spot region 520 is narrow. The processes in S401 to S404 are the same as those in the case in FIG. 8A and therefore the description thereof is omitted. In S405, the obstacle region presumption section 15 calculates the obstacle presence region Ao, and since the gap between the blind spot region 121 and the blind spot region 520 is narrow in the situation which is illustrated in FIG. 8B, a region 621 that a latent obstacle 602 can move reaches the blind spot region 121. The obstacle region presumption section 15 defines a region that the blind spot region 520 and the region 621 are added together as the obstacle presence region Ao.

Accordingly, in the next S405, the region determination section 14A determines not only the blind spot region 520 but also the blind spot region 121 as the dangerous blind spot regions Db. That is, in the blind spot region Ba that the blind spot region identification section 13 identified, the region determination section 14A determines not only the region 121b which overlaps with the obstacle presence region Ao but also the region 121a as the dangerous blind spot region. Incidentally, the region 121a can be also called a region which does not overlap with the obstacle present region Ao but is contiguous to the region 121b which overlaps with the obstacle presence region Ao.

Since the blind spot region 121 comes to be determined that there is a risk that the obstacle would be present latently, dangerous lane change is avoided in a traveling control information generation/output process in S305 in FIG. 5. Incidentally, although it is effective to determine the entire of the blind spot region 121 as the dangerous blind spot region Db for simplification of the process, in a case of placing high importance on strictness, the region 121a is not contained and the region 121b that the region 621 and the blind spot region 121 overlap with each other may be determined as the dangerous blind spot region Db.

As described above, in the present embodiment, since the traveling control device 3 can determine the possibility of presence of the obstacle in the blind spot region with no omission by taking also the behavior of the latent obstacle which cannot be detected by the external-field sensor group 4 into consideration, it is possible to increase safety of traveling control of the vehicle.

Second Operation Example

Figure 9:
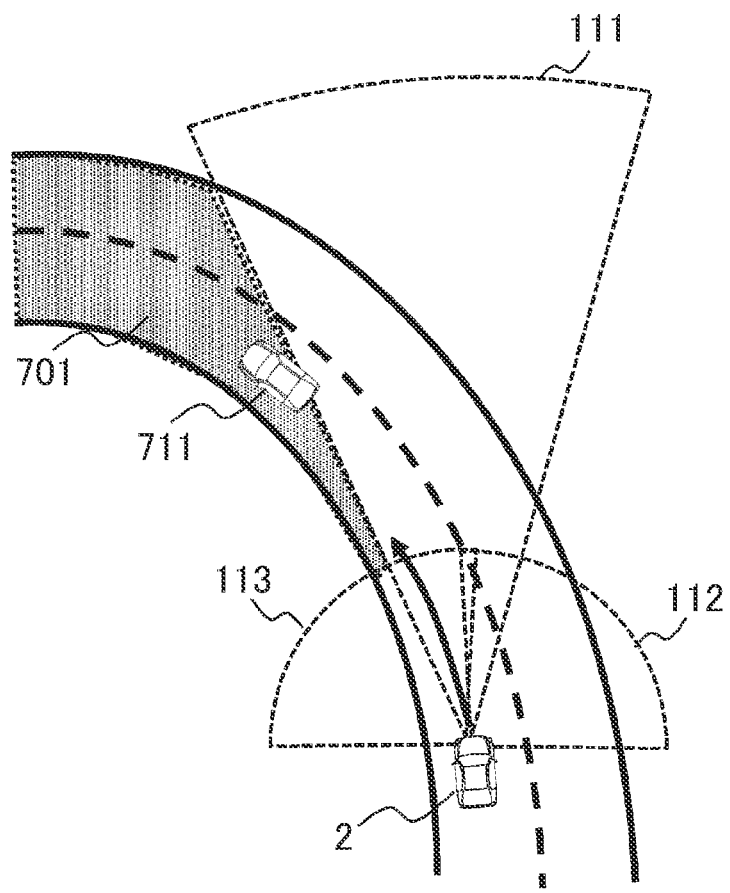
FIG. 9 is a diagram explaining a situation of a second operation example.

The second operation example which is a concrete example of a safety determination process in S407 will be described with reference to FIG. 9 to FIG. 10. FIG. 9 illustrates a scene that the vehicle 2 is traveling along a blind curve. In a forward curve region, a region 701 which is out of the detection ranges 111 to 113 of the external-field sensor group 4 on the vehicle 2 becomes the blind spot region. Incidentally, as will be described in the following, a vehicle 711 is a vehicle presence of which is supposed and is not a vehicle which was detected by the external-field sensor group 4 without distinction of whether it is actually present.

In the scene which is illustrated in FIG. 9, when executing the blind spot region risk determination process which is indicated in S304, the blind spot region 701 the safety of which cannot be verified becomes the dangerous blind spot region Db. The one which is supposed to be the most dangerous as the latent obstacle which can be present in the blind spot region 701 is a vehicle which is the closest to the own vehicle 2 in a region which cannot be detected and is large in relative speed for reasons that it is standing, that is, a standing vehicle 711 which is at the boundary of the blind spot region 701. Accordingly, in the traveling control information generation/output process which is S305 in FIG. 5, even in a case where the standing vehicle 711 which is the latent obstacle is present, the vehicle 2 controls traveling so as to make it possible to avoid it or to stop safely. For example, in the scene which is illustrated in FIG. 9, the traveling control device 3 travels with the speed being reduced.

Figure 10A:
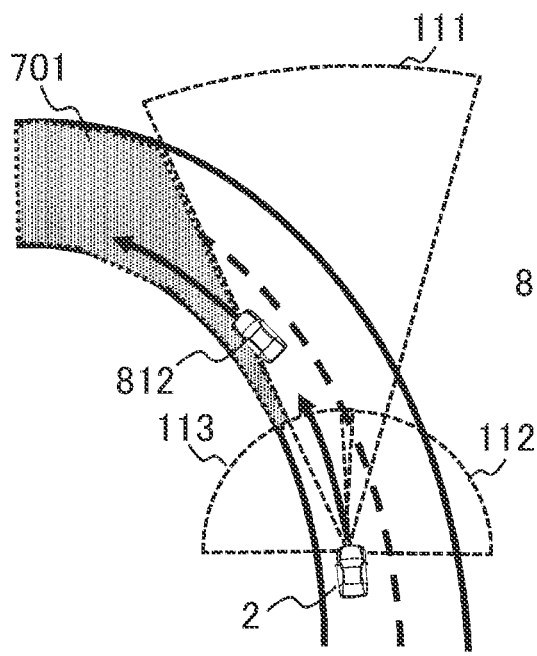
FIGS. 10A and 10B are diagrams illustrating a processing result in the second operation example.

FIG. 10A illustrate a situation where the external-field sensor group 4 on the vehicle 2 is detecting a preceding vehicle 812. Also in this situation, it is guessed that the entire of the blind spot region 701 is the temporary dangerous blind spot region tDb in S406 in FIG. 6.

However, in the situation which is illustrated in FIG. 10, the preceding vehicle 812 is present in the vicinity of the boundary of the blind spot region 701 and is traveling toward the blind spot region 701. At that time, when assuming presence of the standing vehicle 711 in FIG. 7, the preceding vehicle 812 will collide with the standing vehicle 711. Since it is thought that also the preceding vehicle 812 travels so as not to collide with the obstacle, to assume the presence of the latent obstacle 711 contradicts with the behavior of the preceding vehicle 812 which is detected by the external-field sensor group 4. Accordingly, it is guessed that the standing vehicle 711 is not present.

Figure 10B:
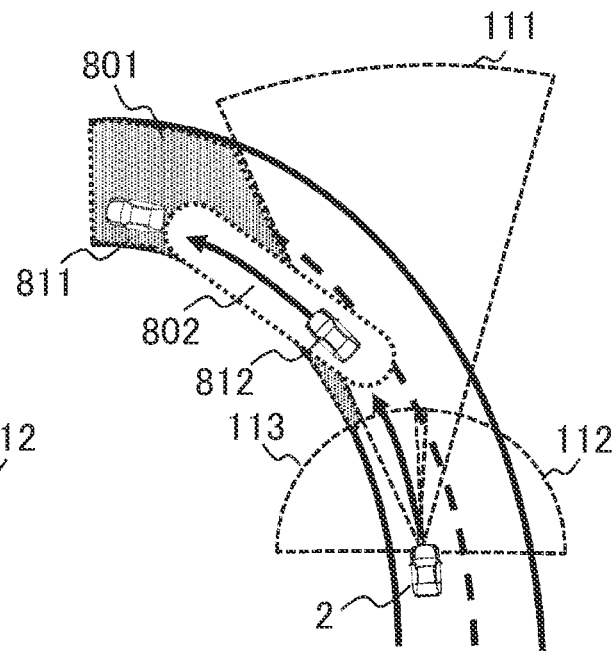

When changing the viewpoint, this means that the latent obstacle cannot be present in a region that the preceding vehicle 8i2 cannot avoid traveling such as a region 802 in FIG. 10B. The region that the traveling cannot be avoided is, for example, a region that it cannot stop even when executing braking of a predetermined decelerated speed. In S407, the safety of part of the blind spot region is determined on the basis of contradiction with the behavior of the obstacle which is detected by the external-field sensor group 4 in this way. As a result, in the scene which is illustrated in FIG. 10, the position that the latent obstacle is supposed becomes a position with a sign 811 and it moves in an advancing direction more forward than that in the example in FIG. 9.

Since the distance relative to the latent obstacle is widened in comparison with the scene in FIG. 9, a speed constraint on the latent obstacle is relaxed in S305 in FIG. 5. Accordingly, it becomes possible for the vehicle 2 to travel at a speed which is faster than that in the scene in FIG. 9. Since the speed of the vehicle 2 is controlled also by taking the risk of collision with the preceding vehicle 812 into consideration in reality, in a case where the speed of the preceding vehicle 812 is low, the speed of the vehicle 2 is not always increased. However, in a case where the speed of the preceding vehicle 812 is higher than the speed of the vehicle 2 in FIG. 9, it is thought that the speed of the vehicle 2 becomes higher in the situation in FIG. 10.

Incidentally, although, in the above description, the region that the detected vehicle 812 cannot avoid traveling was determined to be safe, a region that predetermined time movement of the detected vehicle 812 is predicted may be determined to be safe. Persons often premise that the obstacles such as peripheral vehicles and so forth do not change so much from present-time states. This is because, in general, a human being drives so as to avoid acute traveling change which induces worsening of riding comfortability while always predicting the surrounding situation. Accordingly, realization of traveling control which is close to driving by the human being can be expected by evaluating the risk on the basis of prediction of future movement of the obstacles.

Third Operation Example

Figure 11A:
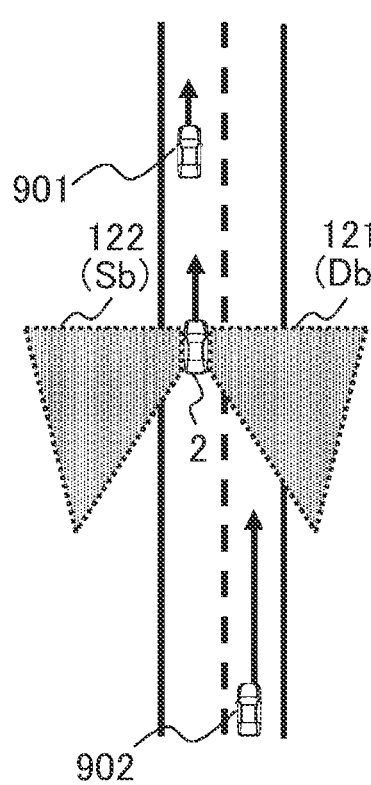
FIGS. 11A, 11B, and 11C are diagrams explaining a third operation example.
Figure 11B:
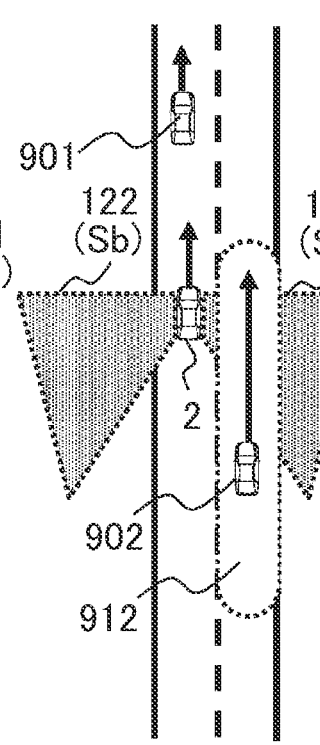
Figure 11C:
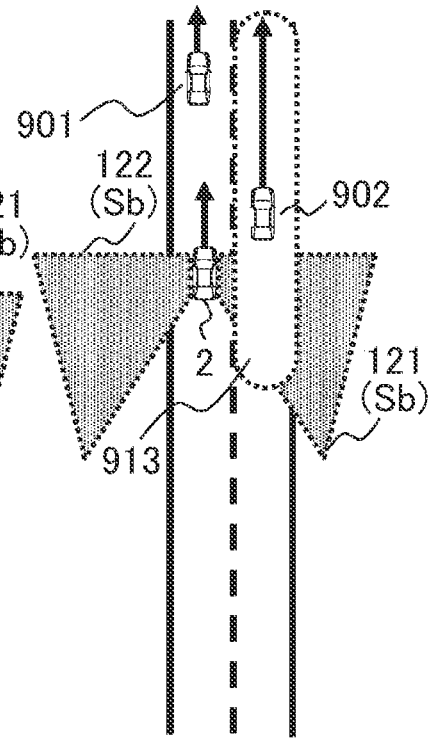

FIG. 11 illustrates time-series changes of a scene that the vehicle 2 is traveling along the general lane on a road with two lanes on each side and it exhibits at first a state which is illustrated in FIG. 11A, then a state which is illustrated in FIG. 11B, and finally a state which is illustrated in FIG. 11C. The vehicle 2 has the blind spot region 121 and the blind spot region 122. In the scene which is illustrated in FIG. 11A, the blind spot region 121 is determined as the dangerous blind spot region Db and the blind spot region 122 is determined as the safe blind spot region Sb. In all of FIG. 11B to FIG. 11C, another vehicle 902 is traveling along a passing lane which is different from that of the vehicle 2. In FIG. 11A, another vehicle 902 is located more rearward than the own vehicle 2 and another vehicle 902 is traveling at a speed which is faster than that of the own vehicle 2.

In FIG. 11B, although another vehicle 902 is located more rearward than the own vehicle 2, another vehicle 902 comes closer to the vehicle 2 than that in FIG. 11A. In this state, assuming that the obstacle is present in the blind spot region 121, another vehicle 902 will come into collision with the obstacle and the contradiction occurs. That is, it means that there is an error in the assumption and it can be determined that the obstacle is not present in the blind spot region 121.

Also in a case where another vehicle 902 passes through the blind spot region 121 and moves more forward than the own vehicle 2 as illustrated in FIG. 11C, it is possible to identify that it is the obstacle which is the same as the above by combining with conventional technologies such as tracking of the position of another vehicle 902, monitoring of input and output of the obstacle relative to the blind spot region 121 and so forth and to determine that the obstacle is not present in the blind spot region 121. In addition, in FIG. 11C, from a viewpoint that presence of another obstacle just behind another vehicle 902 which is traveling at a compara- tively high speed never occur for safety, it is also possible to determine that the obstacle is not present on the passing lane in the blind spot region 121.

According to the above-mentioned embodiment, the following operational effects can be obtained.

(1) The traveling control device 3 which is the electronic control device is loaded on the vehicle 2. The traveling control device 3 is equipped with the peripheral obstacle identification section 12 which identifies the obstacle which is present around the vehicle 2 on the basis of the output from the external-field sensor group 4 which is loaded on the vehicle 2, the blind spot region identification section 13 which identifies the blind spot region Ba which is not contained in the detection range of the peripheral obstacle identification section 12, the region determination section 14A which classifies the blind spot region Ba into the temporary dangerous blind spot region tDb that the obstacle can be present and the temporary safe blind spot region tSb that the obstacle is not present, and the obstacle region presumption section 15 which presumes the obstacle presence region Ao which is the region that the latent obstacle which is the latent obstacle which could be present at the previous time in the dangerous blind spot region Db which was classified at the previous time, that is, in the previous processing cycle can be present at the present time. The region determination section 14A determines that the region which overlaps with at least the obstacle presence region Ao is the temporary dangerous blind spot region tDb, in the blind spot region Ba that the blind spot region identification section 13 identified. Therefore, since the traveling control device 3 calculates the dangerous blind spot region Db by taking also the latent obstacle that the external-field sensor group 4 cannot detect into consideration, the safety is improved.

(2) The region determination section 14A determines that, in the blind spot region Ba that the blind spot region identification section 13 identified, the region 121b which overlaps with the obstacle present region Ao, and the region 121a which does not overlap with the obstacle present region Ao but is contiguous to the region 121b which overlaps with the obstacle present region Ao are the temporary dangerous blind spot region tDb, and determines that, in the blind spot region Ba, the region 122 which is the region which does not overlap with the obstacle present region Ao and which is not contiguous to the obstacle presence region Ao is the safe blind spot region.

(3) The traveling control device 3 determines whether the temporary dangerous blind spot region tDb that the region determination section 14A classified is safe and changes the region that it determined to be safe from the dangerous blind spot region Db to the safe blind spot region Sb. In other words, it is equipped with the risk determination section 14 which changes the temporary dangerous blind spot region tDb that it determined to be safe to the safe blind spot region Sb. Therefore, over-consideration of the risk which is not actually present can be avoided.

(4) The obstacle region presumption section 15 presumes the obstacle presence region Ao by using the dangerous blind spot region Db that the risk determination section 14 changed. Therefore, over-consideration of the risk which is not actually present can be avoided.

(5) In a case where it is determined that there is a risk of collision of the obstacle that the peripheral obstacle identification section 12 detected with the latent obstacle, the risk determination section 14 determines that the dangerous blind spot region tDb is the safe blind spot region Sb.

(6) The risk determination section 14 determines that the dangerous blind spot region Db that it is predicted that the obstacle that the peripheral obstacle identification section 12 detected will travel within a predetermined time is safe. For example, in FIG. 11B, it determines that a region that a traveling region 912 that traveling of another vehicle 902 is predicted overlaps with the region 121 which is the dangerous blind spot region Db is safe. Therefore, the risk of the temporary dangerous blind spot region tDb can be determined by utilizing the obstacle that the external-field sensor group 4 detected.

(7) The risk determination section 14 presumes a travelling region that the obstacle will travel within the predetermined time on the basis of the position and the speed of the obstacle that the peripheral obstacle identification section 12 detected, and determines that the dangerous blind spot region Db which overlaps with the traveling region and the dangerous blind spot region Db which is contiguous to the dangerous blind spot region Db which overlaps with the traveling region are safe. For example, in FIG. 11B, it determines that both of (1) the region that the travelling region 912 that traveling of another vehicle 902 is expected overlaps with the region 121 which is the dangerous blind spot region Db and (2) the dangerous blind spot region Db which is contiguous to that region that they mutually overlap are safe. That is, when (1) and (2) are added together, it determines that the entire of the region 121 is safe. Therefore, determination of the safety of the region can be performed efficiently.

(8) The blind spot region identification section 13 acquires information on the detection range of the peripheral obstacle identification section 12 from the external-field sensor group 4 and identifies the blind spot region Ba. Therefore, the traveling control device 3 can utilize the information on the detection range that each of the external-field sensors has.

(9) The traveling control device 3 is equipped with the traveling control planning section 16 which controls the traveling of the vehicle 2. The traveling control planning section 16 changes control of the vehicle 2 on the basis of a result of determination of the risk determination section 14. Therefore, the traveling control device 3 can control the vehicle 2 by taking also the latent obstacle that the external-field sensor group 4 which is loaded on the vehicle 2 cannot detect into consideration.

(10) The traveling control planning section 16 controls the traveling of the vehicle 2 in such a manner that the latent obstacle which can be present in the dangerous blind spot region Db can be avoided. Therefore, the traveling control device 3 can avoid the latent obstacle that the external-field sensor group 4 cannot detect.

As described above, according to the present embodiment, in a case where it is assumed that the obstacle is present in the blind spot region, in a case where the behavior of the obstacle which was detected by the external-field sensor group 4 and so forth is in contradiction with assumption, it determines that the obstacle is not present in the blind spot region concerned. Thereby, since over-consideration of the risk which is not present actually can be avoided, it is possible to realize control of more natural and comfortable traveling of the vehicle while securing safety.

Modified Example 1

Various approaches can be taken for the safety determination process on the dangerous blind spot region Db which is indicated in S407 other than the above-mentioned embodiment. For example, speed changing of the own vehicle 2 may be utilized as follows. That is, in the scene which is illustrated in FIG. 11, the blind spot region 121 and the blind spot region 122 become the dangerous blind spot regions Db for a long stretch of time in a case where another vehicle travels side by side with the vehicle 2 at mutually equivalent speeds.

In a case where there of no speed change of the vehicle 2, a possibility that another vehicle travels side by side with it similarly is conceivable. However, in a case where a change of the speed of the vehicle 2 which exceeds the predetermined one was conducted more than a predetermined number of times, it is difficult to think that another vehicle travels side by side with it by changing the speed in the same way. Accordingly, in a case where the obstacle is not detected from the blind spot region concerned in spite of execution of intentional changing of the speed of the vehicle 2 which exceeds the predetermined one more than the predetermined number of times in the traveling control information generation/output process which is S305 in FIG. 5, it may be determined that the obstacle is not present in the blind spot region concerned.

According to this modified example 1, the following operational effects can be obtained.

(11) In a case of occurring speed change of the vehicle 2 which exceeds the predetermined one more than the predetermined number of times as to the temporary dangerous blind spot region tDb which is present on the side face of the vehicle 2, the risk determination section 14 determines that the temporary dangerous blind spot region tDb concerned is safe. Therefore, the traveling control device 3 can determine the safety of the temporary dangerous blind spot region tDb with ease. Incidentally, in this modified example 1, a time concept may be further combined with the speed change. That is, in a case where the speed change which exceeds the predetermined one was performed with frequency which exceeds the predetermined one as to the temporary dangerous blind spot region tDb which is present on the side face of the vehicle 2, in a case where the speed changing of the vehicle 2 which exceeds the predetermined one was executed with a change which exceeds the predetermined one, the risk determination section 14 may determine that the temporary dangerous blind spot region tDb concerned is safe.

Modified Example 2

The traveling control information generation/output process which is S305 in FIG. 5 is, a controlling method may be changed in accordance with a probability that the obstacle is present in the blind spot region. For example, such adaptive control is possible that in a case where the possibility that the obstacle is present in a forward blind spot region is high, importance is attached to the safety by suppressing the speed, and in a case where the possibility is low, importance is attached to the comfortability by increasing the speed. In that case, the blind spot risk determination process is, it is desirable not to determine yes or no of presence of the obstacle in the blind spot region with two values but to determine it with a presence probability.

The presence probability is determined on the basis of, for example, statistical information data group and so forth. The statistical information data group is data base that national and industry associations statistically processed accident risks which are caused by the blind spots, for example, near-miss case examples that rear-end collisions on poor visibility curves, jumping out of the blind spot and so forth were evaluated from vehicle traveling history data. In the blind spot region which falls under a spot and a time zone which statistically indicate that the risk is high, it becomes possible to control traveling more safely in the highly risky spot and time zone by setting the obstacle presence probability higher. The statistical information data group may be stored in the storage unit 30 in advance and may be acquired from the outside via the external communication device 8. In addition, the statistical information data group may be prepared from the traveling history of the vehicle 2.

Figure 12:
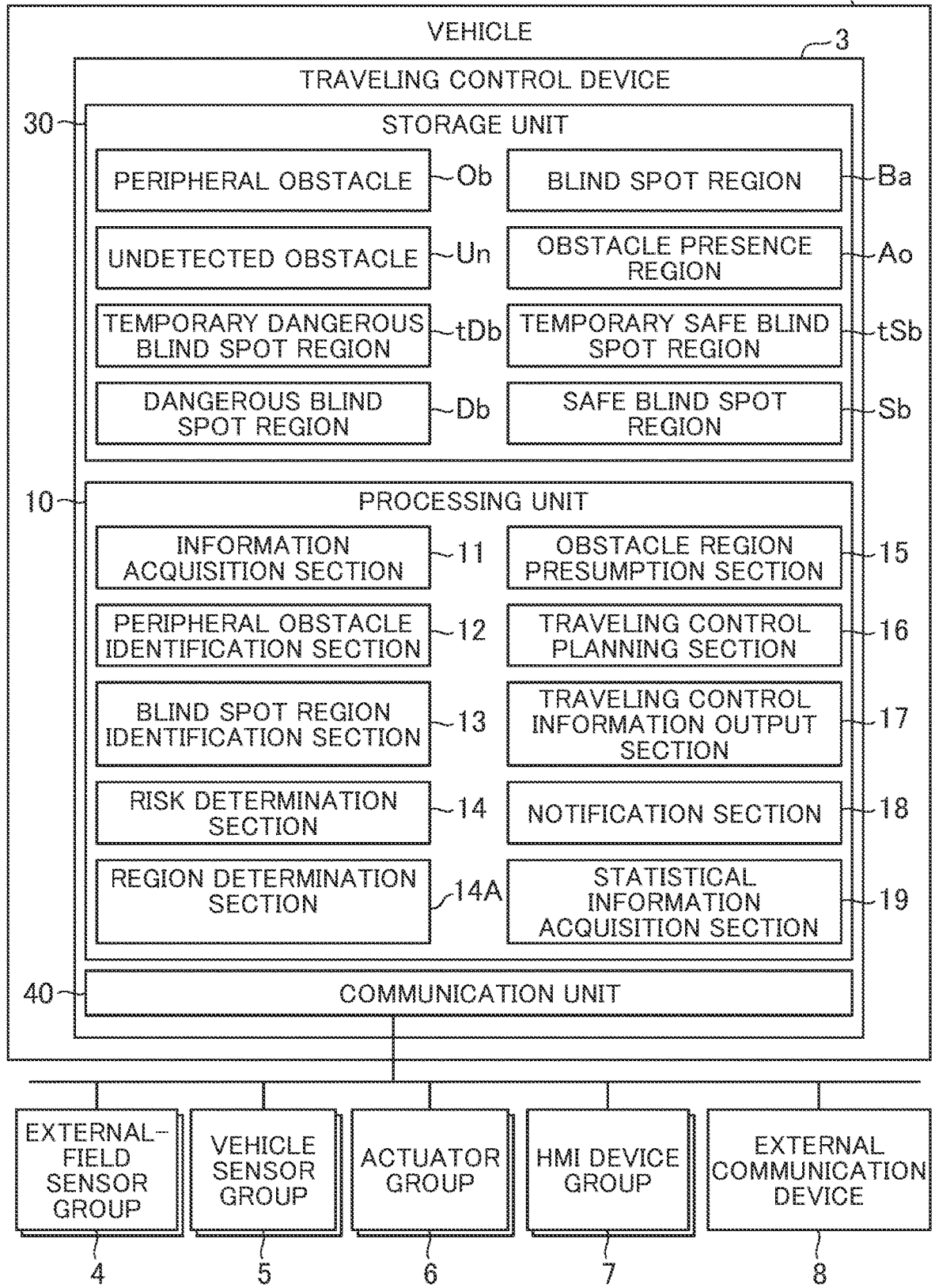
FIG. 12 is a functional block diagram of the travelling control device in a modified example 2.

FIG. 12 is a functional block diagram of the traveling control device 3 in the present modified example. In comparison with FIG. 1, in FIG. 12, a statistical information acquisition section 19 is added to the processing unit 10. The statistical information acquisition section 19 acquires the statistical information from the storage unit 30. In the present modified example, the risk determination section 14 presumes the obstacle presence probability in the blind spot region from present time zone and position of the vehicle 2, and the statistical information in addition to the determination by the embodiment.

According to this modified example 2, the following operational effects can be obtained.

(12) The risk determination section 14 presumes the obstacle presence probability which is the probability that the obstacle can be present with the dangerous blind spot region Db being set as an object and determines whether the dangerous blind spot region Db is safe on the basis of the obstacle presence probability. Accordingly, the traveling control device 3 can realize adaptive traveling control that the balance between the safety and the comfortability is taken into consideration by probabilistically expressing the possibility of presence of the obstacle in the blind spot region.

(13) The traveling control device 3 is equipped with the statistical information acquisition section 19 which acquires the statistical information on a degree of risk that the obstacle is present in the blind spot region. The risk determination section 14 presumes the obstacle presence probability on the basis of the statistical information that the statistical information acquisition section acquired. Therefore, the traveling can be controlled more safely on the spot and the time zone which are statistically high in risk by presuming the probability of presence of the obstacle in the blind spot region on the basis of statistical information that the risk degree that the obstacle is present in the blind spot region is linked with the spot and the time zone.

Modified Example 3

It is desirable that the HMI information which is generated/output in the HMI information generation/output process which is S306 in FIG. 5 be the one that the result of determination of the blind spot region risk determination process is reflected. For example, in the grid-like map such as that which is illustrated in FIG. 2B, the one that the dangerous blind spot region Db and the latent obstacle are expressed is conceivable. Since presumption processes in S406 and S407 are contained in calculation of the dangerous blind spot region Db, it does not mean that it indicates the detection state itself of the external-field sensor group 4. For example, in the example which is illustrated in FIG. 8, a state of things that, although the blind spot region 121 was not expressed as the dangerous blind spot region Db in the situation in FIG. 8A, it comes to be expressed as the dangerous blind spot region Db in the situation in FIG. 8B is observed.

In addition, in the traveling scenes in FIG. 10 and FIG. 11, a state of things that part of the region which has been expressed as the dangerous blind spot region Db so far is determined to be safe owing to behavers of other obstacles and it comes to be expressed as the safety region is observed. Further, also the latent obstacle is displayed as well and thereby it becomes possible for the driver and the occupant to understand that the vehicle system 1 controls traveling by taking what kind of latent risk into consideration and an effect of eliminating an uncomfortable feeling which involves in automatic traveling can be expected.

According to this modified example 3, the following operational effects can be obtained.

(14) The traveling control device 3 is equipped with the notification section 18 which outputs information on the dangerous blind spot region Db that the risk determination section 14 determined. Therefore, it becomes possible to inform the occupant of the vehicle 2 of the dangerous blind spot region Db which is present around the vehicle 2.

Modified Example 4

In the above-mentioned embodiment, the traveling control device 3 was equipped with the risk determination section 14 as its function. However, the traveling control device 3 may not be equipped with the risk determination section 14. In this case, the region determination section 14A outputs the dangerous blind spot region Db and the safe blind spot region Sb. That is, in the present modified example, the temporary dangerous blind spot region tDb and the temporary safe blind spot region tSb are not present.

Figure 13:
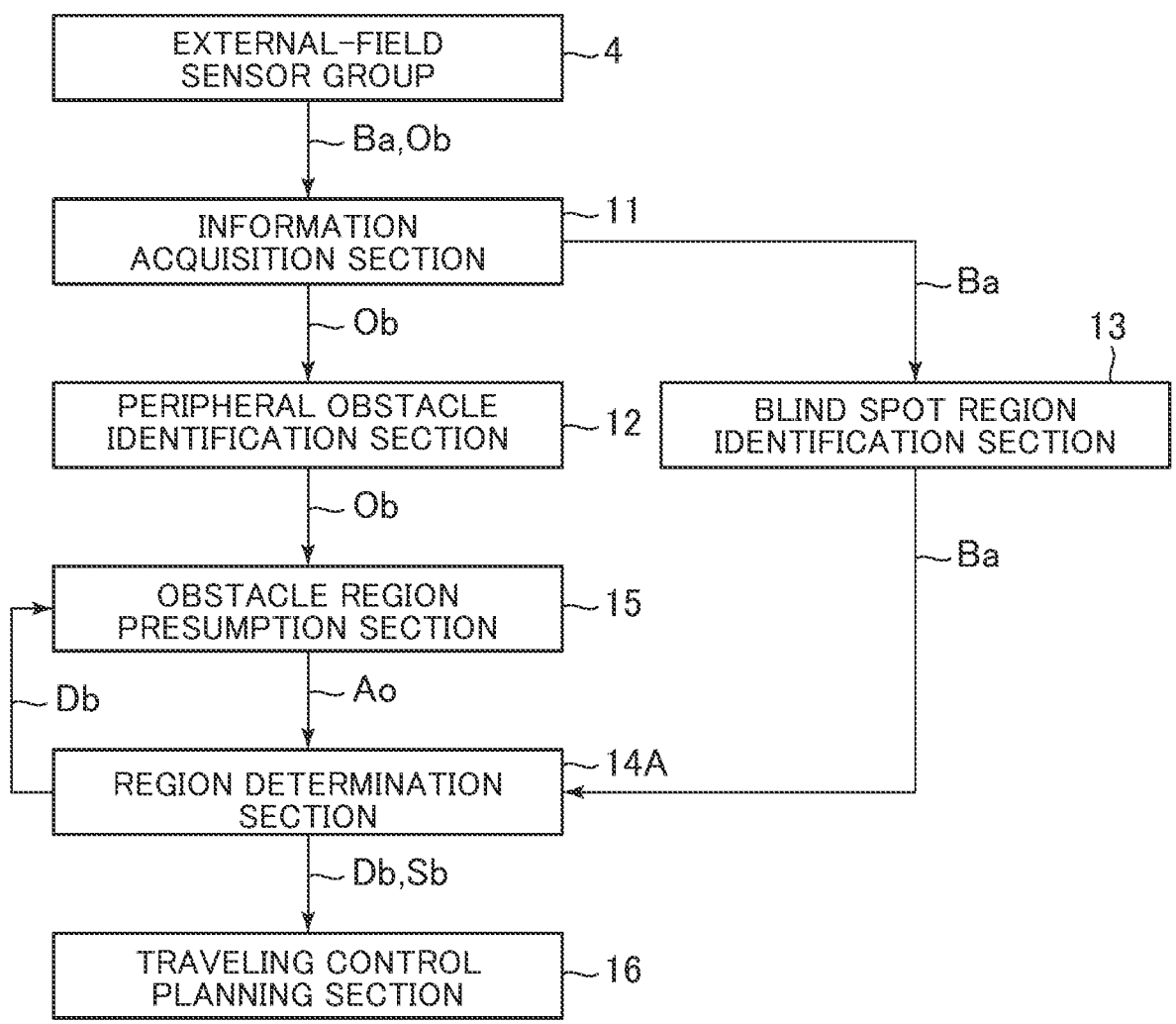
FIG. 13 is a diagram illustrating a correlation among functions that the traveling control device 3 in a modified example 4 realizes.

FIG. 13 is a diagram illustrating a correlation among the functions that the traveling control device 3 in the modified example 4 realizes. In the present modified example, the region determination section 14A outputs the dangerous blind spot region Db and the safe blind spot region Sb to the traveling control planning section 16. In addition, the region determination section 14A outputs the dangerous blind spot region Db to the obstacle region presumption section 15.

According to this modified example 4, although overconsideration of the risk cannot be avoided differently from the embodiment because the risk determination section 14 is not provided, the dangerous blind spot region Db can be calculated by taking also the latent obstacle that the external-field sensor group 4 cannot detect into consideration.

Modified Example 5

In the above-mentioned embodiment, the external-field sensor group 4 output not only the peripheral obstacle Ob but also the blind spot region Ba. However, the external-field sensor group 4 may output only the peripheral obstacle Ob. In this case, the travelling control device 3 calculates the blind spot region Ba by using the peripheral obstacle Ob and an output from the vehicle sensor group 5 and so forth. As has been explained with reference to FIG. 2, the blind spot region Ba is the region that the region which is out of the detection range of the external-field sensor group 4 and the region which is shielded with the obstacle are added together.

The traveling control device 3 can calculate the region which is out of the detection range of the external-field sensor group 4, for example, by acquiring information on a temperature, a weather and so forth of the external-field environment of the vehicle 2 and using a relation between the already known external field environment and the detection range of the external-field sensor group 4. In addition, the traveling control device 3 can calculate the region which is shielded with the obstacle from a positional relation between the peripheral obstacle Ob and the vehicle 2. Therefore, the traveling control device 3 can calculate the blind spot region Ba by adding these two regions together.

Incidentally, the above-described embodiment is one example and the present invention is not limited to this. That is, various applications are possible and all embodiments are contained in the scope of the present invention. For example, although in the above-mentioned embodiment, the blind spot region was expressed in a predetermined form, it may be expressed in units of cells of the grid-like map as illustrated in FIG. 2 and may be expressed with an aggregate of a plurality of cells.

For example, although, in the above-mentioned embodiment, a description is made on the assumption that respective processes are executed by the same processing unit and storage unit in the traveling control device 3, they may be executed by pluralities of different processing units and storage units. In this case, for example, it takes the form that pieces of processing software which have the same configuration are loaded in the respective storage units and the respective processing units execute the processes concerned in a shared manner.

In addition, although each process of the traveling control device 3 is realized by executing a predetermined operation program by using the processor and the RAM, it is also possible to realize it by unique hardware as necessary. In addition, although, in the above-mentioned embodiment, the external-field sensor group, the vehicle sensor group, the actuator group, the HMI device group, and the external communication device are described as individual devices, it is also possible to realize them by mutually combining optional any two or more ones as necessary.

In addition, control lines and information lines which are thought to be necessary for explanation of the embodiment are illustrated in the drawings and they do not always indicate all the control lines and information lines which are contained in an actual product to which the present invention was applied. In reality, it may be thought that almost all the configurations are mutually connected.

In the above-mentioned respective embodiment and modified examples, the configuration of the functional block is merely one example. Some functional configurations which were illustrated as respective functional blocks may be integrally configured and the configuration which is expressed in one functional block diagram may be divided into two or more functions. In addition, a configuration that another functional block is equipped with some of the functions that respective functional blocks have may be also made.

The above-mentioned respective embodiment and modified examples may be mutually combined. Although various embodiment and modified examples were described in the above, the present invention is not limited to contents of them. Also other aspects which are conceivable in the scope of the technical thought of the present invention are also included in the scope of the present invention.

The content which is disclosed in the following application on the basis of which the priority is claimed is incorporated herein as a citation.

Japanese Patent Application No. 2019-98892 (filed on May 27, 2019)

REFERENCE SIGNS LIST

1 . . . vehicle system
2 . . . vehicle
3 . . . traveling control device
4 . . . external-field sensor group
5 . . . vehicle sensor group
6 . . . actuator group
7 . . . HMI device group
8 . . . external communication device
10 . . . processing unit
11 . . . information acquisition section
12 . . . peripheral obstacle identification section
13 . . . blind spot region identification section
14 . . . risk determination section
14A . . . region determination section
15 . . . obstacle region presumption section
16 . . . traveling control planning section
17 . . . traveling control information output section
18 . . . notification section
30 . . . storage unit
Ao . . . obstacle presence region
Ba . . . blind spot region
Db . . . dangerous blind spot region
tDb . . . temporary dangerous blind spot region
Sb . . . safe blind spot region
tSb . . . temporary safe blind spot region
Ob . . . peripheral obstacle
Un . . . undetected obstacle

The invention claimed is:

1. An electronic control device which is loaded on a vehicle comprising:
a memory; and
a processor including:
a peripheral obstacle identification section identifies a first peripheral obstacle which is present around the vehicle on the basis of an output from a sensor on the vehicle, and a second peripheral obstacle from a previous processing cycle;
a blind spot region identification section identifies a blind spot region not contained in a detection range of the peripheral obstacle identification section;
a region determination section classifies the blind spot region into a dangerous blind spot region where the first peripheral obstacle can be present and a safe blind spot region where the first peripheral obstacle is not present; and
an obstacle region presumption section
acquires a second dangerous blind spot region, stored in the memory, which is a dangerous blind spot region from a previous processing cycle,
extracts a latent obstacle from the first peripheral obstacle and the second peripheral obstacle, and
presumes an obstacle presence region which is a region where the latent obstacle potentially can enter between the previous processing cycle and a present processing cycle and the obstacle presence region is presumed based on a combination of the latent obstacle and the second dangerous blind spot region, wherein
the region determination section determines that a first region which overlaps with at least the obstacle presence region in the blind spot region is the second dangerous blind spot region.

2. The electronic control device according to claim 1, wherein the region determination section
determines that the first region and a second region which does not overlap with the obstacle presence region but is contiguous to the first region a temporary dangerous blind spot region, and determines that a third region which does not overlap with the obstacle presence region and is not contiguous to the obstacle presence region is a temporary safe blind spot region.

3. The electronic control device according to claim 1, wherein
the region determination section determines that the first region is a temporary dangerous blind spot region and determines that a second region which does not overlap with the obstacle presence region is the safe blind spot region in the blind spot region.

4. The electronic control device according to claim 1, further comprising:
a risk determination section,
wherein the region determination section presumes a temporary dangerous blind spot region and a temporary safe blind spot region from the blind spot region and the obstacle presence region, and
wherein the risk determination section performs a safety determination on the temporary dangerous blind spot region, and on a condition that the temporary dangerous blind spot region is classified as safe the temporary dangerous blind spot region is changed to the safe blind spot region.

5. The electronic control device according to claim 4, wherein
the obstacle region presumption section presumes the obstacle presence region by further using the temporary dangerous blind spot region.

6. The electronic control device according to claim 4, wherein
the risk determination section, in a case where it is determined that there is a risk in the temporary dangerous blind spot region that the first peripheral obstacle will collide with the latent obstacle and information from the sensor is in contradiction with this determination, determines that the temporary dangerous blind spot region is the safe blind spot region.

7. The electronic control device according to claim 6, wherein
the risk determination section determines that the temporary dangerous blind spot region that the first peripheral obstacle will travel within a predetermined time is safe.

8. The electronic control device according to claim 7, wherein the risk determination section
presumes a traveling region that the first peripheral obstacle travels within the predetermined time on the basis of a position and a speed of the obstacle that the peripheral obstacle identification section detected, and determines that a dangerous blind spot region which overlaps with the traveling region and a dangerous blind spot region which is contiguous to the dangerous blind spot region which overlaps with the traveling region are both safe.

9. The electronic control device according to claim 8, wherein
the risk determination section determines, in a case where a speed change of the vehicle which exceeds a predetermined speed change more than a predetermined number of times, that the temporary dangerous blind spot region is present on a side face of the vehicle is safe.

10. The electronic control device according to claim 4, wherein
the risk determination section presumes an obstacle presence probability which is a probability that the first peripheral obstacle can be present with the temporary dangerous blind spot region being set as an object and determines whether the temporary dangerous blind spot region is safe on the basis of the obstacle presence probability.

11. The electronic control device according to claim 10, further comprising:
a statistical information acquisition section which acquires statistical information on a degree of risk that the first peripheral obstacle is present in the blind spot region, wherein
the risk determination section presumes the obstacle presence probability on the basis of the statistical information.

12. The electronic control device according to claim 4, further comprising:
a traveling control planning section which controls traveling of the vehicle, wherein
the traveling control planning section changes control of the vehicle on the basis of a result of determination of the risk determination section.

13. The electronic control device according to claim 12, wherein
the traveling control planning section controls traveling of the vehicle such that the latent obstacle can be avoided.

14. The electronic control device according to claim 1, wherein
the blind spot region identification section acquires information on the detection range from the sensor and identifies the blind spot region.

15. The electronic control device according to claim 1, further comprising:
a notification section which outputs information on the temporary dangerous blind spot region.

* * * * *